US012782580B1

(12) United States Patent
Angus et al.

(10) Patent No.: US 12,782,580 B1
(45) Date of Patent: Nov. 3, 2026

(54) LIGHT DETECTION AND RANGING (LIDAR) SYSTEM WITH APERTURE SWITCHING FOR DUTY CYCLE IMPROVEMENT

(71) Applicant: Aurora Operations, Inc., Mountain View, CA (US)

(72) Inventors: Edward Angus, Bozeman, MT (US); Zeb William Barber, Bozeman, MT (US)

(73) Assignee: AURORA OPERATIONS, INC., Pittsburgh, PA (US)

( * ) Notice: Subject to any disclaimer, the term of this patent is extended or adjusted under 35 U.S.C. 154(b) by 885 days.

(21) Appl. No.: 18/183,618

(22) Filed: Mar. 14, 2023

(51) Int. Cl.
*G01S 17/931* (2020.01)
*G01S 7/481* (2006.01)
*G02B 26/12* (2006.01)

(52) U.S. Cl.
CPC .......... *G01S 17/931* (2020.01); *G01S 7/4814* (2013.01); *G01S 7/4817* (2013.01); *G02B 26/121* (2013.01)

(58) Field of Classification Search
None
See application file for complete search history.

(56) References Cited

U.S. PATENT DOCUMENTS 11,016,197 B1 5/2021 Barber et al.
2018/0284286 A1* 10/2018 Eichenholz ............ G01S 17/89

* cited by examiner

*Primary Examiner* — Luke D Ratcliffe
(74) *Attorney, Agent, or Firm* — Dority & Manning, P.A.

(57) ABSTRACT

A LIDAR system for a vehicle is provided. The LIDAR system includes a laser source configured to generate a beam, a switch, and a polygon scanner. The switch is configured to controllably channel the beam into at least: (i) a first beam portion channeled through a first aperture; and (ii) a second beam portion channeled through a second aperture. The polygon scanner is configured to: (i) receive and reflect the first beam portion during a first time window; and (ii) receive and reflect the second beam portion during a second time window.

20 Claims, 9 Drawing Sheets

LIGHT DETECTION AND RANGING (LIDAR) SYSTEM WITH APERTURE SWITCHING FOR DUTY CYCLE IMPROVEMENT

BACKGROUND

LIDAR systems use lasers to create three-dimensional representations of surrounding environments. A LIDAR system includes at least one emitter paired with a receiver to form a channel, though an array of channels may be used to expand the field of view of the LIDAR system. During operation, each channel emits a laser beam into the environment. The laser beam reflects off of an object within the surrounding environment, and the reflected laser beam is detected by the receiver. A single channel provides a single point of ranging information. Collectively, channels are combined to create a point cloud that corresponds to a three-dimensional representation of the surrounding environment. The resultant point cloud data can be beneficial for a variety of applications, including altimetry, imaging, and vehicle navigation.

SUMMARY

Aspects and advantages of embodiments of the present disclosure will be set forth in part in the following description, or may be learned from the description, or may be learned through practice of the embodiments.

Example aspects of the present disclosure are directed to LIDAR systems for use with, for example, autonomous vehicles. As further described herein, the LIDAR systems can be used by various devices and platforms (e.g., robotic platforms, etc.) to improve the ability of the devices and platforms to perceive their environment and perform functions in response thereto (e.g., autonomously navigating through the environment).

More particularly, an aperture-switching LIDAR system according to example aspects of the present disclosure includes a laser source, a switch, and a polygon scanner. The laser source is configured to generate a beam. The switch is coupled to the laser source and configured to controllably channel the beam from the laser source into alternating first and second beam portions. For example, the switch is configured to alternately channel the first beam portion through a first aperture and the second beam portion through a second aperture. The polygon scanner can be configured to receive and reflect the alternating first and second beam portions during alternating and non-overlapping/non-concurrent first and second time windows in order to advantageously increase an effective duty cycle of the LIDAR system.

The alternating first and second beam portions can be transmitted by the polygon scanner into a field of view relative to the LIDAR system. Objects within the field of view can reflect or otherwise scatter the transmitted light beams as a corresponding return beam. The LIDAR system can receive the return beam and process the return beam or characteristics thereof to determine object parameters regarding the object such as range, velocity, and Doppler information. The object parameters can be used in autonomous tasks such as object detection and/or tracking, motion forecasting, and ultimately controlling motion and operation of an autonomous vehicle. The advantages of the LIDAR systems described herein are not limited to autonomous vehicles and can be implemented in any type of vehicle or robotic platform equipped with LIDAR sensors.

In some implementations, the LIDAR system additionally includes first and second reflective surfaces. The first reflective surface is configured to receive the first beam portion channeled through the first aperture and to reflect the first beam portion towards the polygon scanner at a first angle (e.g., a first squint angle). The second reflective surface is configured to receive the second beam portion channeled through the second aperture and to reflect the second beam portion towards the polygon scanner at a second angle (e.g., a second squint angle). The polygon scanner alternately receives the first beam portion from the first reflective surface at a first illumination location and the second beam portion from the second reflective surface at a second illumination location. The first and second illumination locations are generally on opposite sides of the polygon scanner. Because of the geometry of the polygon scanner, the first and second beam portions received at the polygon scanner are directed into an overlapping field of view within the environment of the LIDAR system.

In some implementations, the polygon scanner includes a frame and a plurality of mirrors coupled to the frame. The mirrors can respectively include a reflective material, such as but not limited to glass or polished glass. The frame and the plurality of mirrors are included in a rotating optical structure having a polygonal cross section. Motion of the rotating optical structure can be controlled by a motor to control at least one of: (i) a position, or (ii) an orientation, of the rotating optical structure relative to the first and second beam portions directed thereto. For example, a controller can be coupled to a motor of the polygon scanner and to the switch. The controller is configured to control a timing of the switch and a timing of the motor to configure the switch to: (i) channel the first beam portion through the first aperture during a facet break region of the polygon scanner relative to the second aperture; and (ii) channel the second beam portion through the second aperture during a facet break region of the polygon scanner relative to the first aperture.

In some implementations, the polygonal cross section of the rotating optical structure can be designed in accordance with varied geometries. For instance, the polygon scanner can include a rotating polygon having a predetermined number of regular sides. In some embodiments, the predetermined number of sides can be between three (3) and ten (10). In some embodiments, the predetermined number of sides can be between three (3) and six (6).

A LIDAR system according to the present disclosure can provide numerous technical effects and benefits. For instance, an aperture-switching LIDAR system as described herein can be characterized by a duty cycle of greater than about 80%, and as great as about 100% in some embodiments. Further, the disclosed LIDAR systems can be characterized by at least a 2× increase in resolution relative to LIDAR systems without aperture-switching technology as described herein. These performance improvements can facilitate increased efficiency in LIDAR systems by effectively allowing a LIDAR laser source to emit laser light at full power without experiencing significant efficiency hits due to lower duty cycles. For LIDAR systems that include subsequent digital signal processing (DSP) components, the LIDAR system efficiency can also yield processing improvements. When DSP components operate without a lot of memory in a pipelined fashion, efficiency levels of the DSP computing are also improved. These beneficial features and performance enhancements for a LIDAR system can ultimately lead to improved object detection, motion forecasting, and motion control for robotic platforms, and particularly for autonomous vehicles.

In one example aspect of the present disclosure, a LIDAR system for a vehicle is provided. The LIDAR system includes a laser source, a switch, and a polygon scanner. The laser source is configured to generate a beam. The switch is configured to controllably channel the beam into at least: (i) a first beam portion channeled through a first aperture; and (ii) a second beam portion channeled through a second aperture. The polygon scanner is configured to: (i) receive and reflect the first beam portion during a first time window; and (ii) receive and reflect the second beam portion during a second time window.

In some implementations, the LIDAR system further includes a first reflective surface and a second reflective surface. The first reflective surface is configured to receive the first beam portion channeled through the first aperture and reflect the first beam portion towards the polygon scanner at a first angle. The second reflective surface is configured to receive the second beam portion channeled through the second aperture and reflect the second beam portion towards the polygon scanner at a second angle.

In some implementations, the polygon scanner includes a rotating structure having a hexagon-shaped cross section. The first angle and the second angle are between negative three degrees and positive three degrees.

In some implementations, the first time window and the second time window are non-overlapping.

In some implementations, the polygon scanner is configured to reflect the first beam portion during the first time window as a first transmitted beam into a given field of view having an associated angular range. The polygon scanner is also configured to reflect the second beam portion during the second time window as a second transmitted beam into the given field of view and over the associated angular range.

In some implementations, the first beam portion is illuminated through the first aperture for a first portion of a given time window, the first portion corresponding to between about forty-five and fifty-five percent of the given time window. The second beam portion is illuminated through the second aperture for a second portion of the given time window, the second portion corresponding to between about forty-five and fifty-five percent of the given time window.

In some implementations, the polygon scanner includes a rotating polygon having a plurality of reflective surfaces.

In some implementations, the LIDAR system further includes a controller operatively coupled to the switch and a motor of the polygon scanner, the controller configured to control a timing of the switch and a timing of the motor to configure the LIDAR system to (i) channel the first beam portion through the first aperture during a facet break region of the polygon scanner relative to the second aperture and (ii) channel the second beam portion through the second aperture during a facet break region of the polygon scanner relative to the first aperture.

In some implementations, a duty cycle of the polygon scanner is between 80 percent and 100 percent.

In some implementations, the first time window and the second time window are alternately repeated in a successive manner over time.

In another example aspect of the present disclosure, an autonomous vehicle control system is provided. The autonomous vehicle control system includes a LIDAR system. The LIDAR system includes a laser source, a switch, and a polygon scanner. The laser source is configured to generate a beam. The switch is configured to controllably channel the beam into at least: (i) a first beam portion channeled through a first aperture; and (ii) a second beam portion channeled through a second aperture. The polygon scanner is configured to: (i) receive and reflect the first beam portion during a first time window; and (ii) receive and reflect the second beam portion during a second time window.

In yet another example aspect of the present disclosure, an autonomous vehicle is provided. The autonomous vehicle includes a LIDAR system. The LIDAR system includes a laser source, a switch, and a polygon scanner. The laser source is configured to generate a beam. The switch is configured to controllably channel the beam into at least: (i) a first beam portion channeled through a first aperture; and (ii) a second beam portion channeled through a second aperture. The polygon scanner is configured to: (i) receive and reflect the first beam portion during a first time window; and (ii) receive and reflect the second beam portion during a second time window.

Other example aspects of the present disclosure are directed to other systems, methods, vehicles, apparatuses, tangible non-transitory computer-readable media, and devices for motion prediction and/or operation of a device including a LIDAR system having an aperture-switching system as described herein.

These and other features, aspects and advantages of various implementations of the present disclosure will become better understood with reference to the following description and appended claims. The accompanying drawings, which are incorporated in and constitute a part of this specification, illustrate embodiments of the present disclosure and, together with the description, serve to explain the related principles.

DETAILED DESCRIPTION

The following describes the technology of this disclosure within the context of an autonomous vehicle for example purposes only. As described herein, the technology is not limited to an autonomous vehicle and can be implemented within other robotic and computing systems as well as various devices. For example, the systems and methods disclosed herein can be implemented in a variety of ways including, but not limited to, a computer-implemented method, a LIDAR system, LIDAR optics are other components of a LIDAR system, an autonomous vehicle system, an autonomous vehicle control system, a robotic platform system, a general robotic device control system, a computing device, etc.

Figure 1:
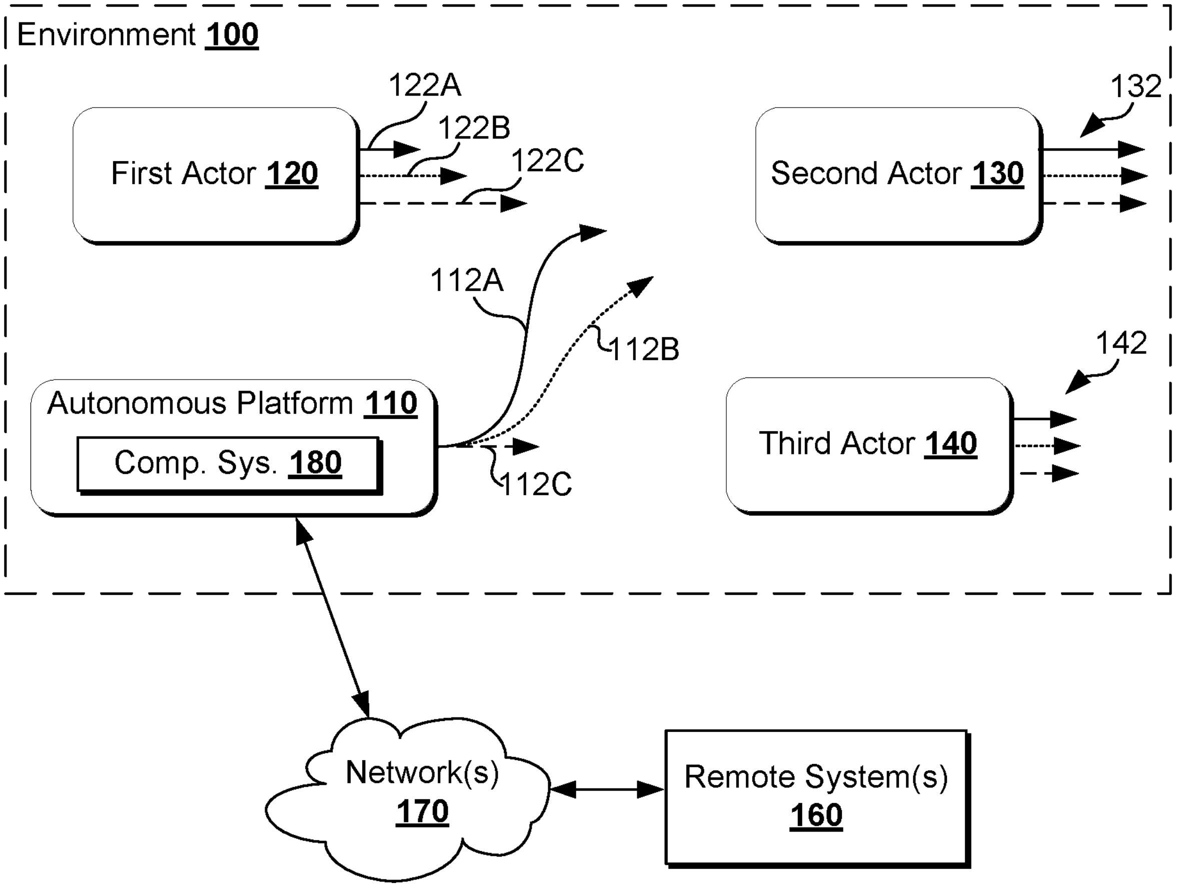
FIG. 1 is a block diagram of an example operational scenario according to some implementations of the present disclosure.

FIG. 1 is a block diagram of an example operational scenario according to example implementations of the present disclosure. In the example operational scenario, an environment 100 contains an autonomous platform 110 and a number of objects, including first actor 120, second actor 130, and third actor 140. In the example operational scenario, the autonomous platform 110 can move through the environment 100 and interact with the object(s) that are located within the environment 100 (e.g., first actor 120, second actor 130, third actor 140, etc.). The autonomous platform 110 can optionally be configured to communicate with remote system(s) 160 through network(s) 170.

In some implementations, the environment 100 can include an indoor environment (e.g., within one or more facilities, etc.) or an outdoor environment. An indoor environment, for example, can include environments enclosed by a structure such as a building (e.g., a service depot, maintenance location, manufacturing facility, etc.). An outdoor environment, for example, can include one or more areas in the outside world such as, for example, one or more rural areas (e.g., with one or more rural travel ways, etc.), one or more urban areas (e.g., with one or more city travel ways, highways, etc.), one or more suburban areas (e.g., with one or more suburban travel ways, etc.), or other outdoor environments.

In some implementations, the autonomous platform 110 can include any type of platform configured to operate within the environment 100. For example, the autonomous platform 110 can include one or more different type(s) of vehicle(s) configured to autonomously perceive and operate within the environment 100. The vehicles, for example, can include one or more ground-based autonomous vehicle(s) such as, for example, one or more autonomous cars, trucks, vans, etc. The autonomous platform 110 can include an autonomous vehicle that can control, be connected to, or otherwise associated with implements, attachments, and/or accessories for transporting people or cargo. This can include, for example, an autonomous tractor optionally coupled to a cargo trailer. In addition, or alternatively, the autonomous platform 110 can include any other type of vehicle such as one or more aerial vehicles, water-based vehicles, space-based vehicles, other ground-based vehicles, etc.

In some implementations, the autonomous platform 110 can communicate with the remote system(s) 160. For instance, the remote system(s) 160 can communicate with the autonomous platform 110 for assistance (e.g., navigation assistance, situation response assistance, etc.), control (e.g., fleet management, remote operation, etc.), maintenance (e.g., updates, monitoring, etc.), or other local or remote tasks. In some implementations, the remote system(s) 160 can provide data indicative of tasks for the autonomous platform 110 to perform. For example, as further described herein, the remote system(s) 160 can provide data indicating that the autonomous platform 110 is to perform a trip/service such as a user transportation trip/service, delivery trip/service (e.g., for cargo, freight, items), etc.

The autonomous platform 110 can communicate with the remote system(s) 160 using the network(s) 170. The network(s) 170 can facilitate the transmission of signals (e.g., electronic signals, etc.) or data (e.g., data from a computing device, etc.) and include any combination of various wired (e.g., twisted pair cable, etc.) or wireless communication mechanisms (e.g., cellular, wireless, satellite, microwave, radio frequency, etc.) or any desired network topology (or topologies). For example, the network(s) 170 can include a local area network (e.g., intranet, etc.), a wide area network (e.g., the Internet, etc.), a wireless LAN network (e.g., through Wi-Fi, etc.), a cellular network, a SATCOM network, a VHF network, a HF network, a WiMAX based network, or any other suitable communications network (or combination thereof) for transmitting data to or from the autonomous platform 110.

As shown for example in FIG. 1, the environment 100 can include one or more objects. This can include object(s) not in motion or not predicted to move ("static objects") or object(s) in motion or predicted to be in motion ("dynamic objects" or "actors"). In some implementations, the environment 100 can include any number of actor(s) such as, for example, one or more pedestrians, animals, vehicles, etc. The actor(s) can move within the environment according to one or more actor trajectories. For instance, the first actor 120 can move along any one of the first actor trajectories 122A-C, the second actor 130 can move along any one of the second actor trajectories 132, the third actor 140 can move along any one of the third actor trajectories 142, etc. In some implementations, the first actor 120, the second actor 130, and/or the third actor 140 can only have one associated trajectory. In some implementations, uncertainty scores (e.g., uncertainty and/or confidence score(s)) can be associated with the first actor trajectories 122A-C, second actor trajectories 132, third actor trajectories 142, etc.

As further described herein, the autonomous platform 110 can utilize its autonomy system(s) to detect these actors (and their movement) and plan its motion to navigate through the environment 100 according to one or more platform trajectories 112A-C. For example, the autonomous platform 110 can include onboard computing system(s) 180. The onboard computing system(s) 180 can include one or more processors and one or more memory devices. The one or more memory devices can store instructions executable by the one or more processors to cause the one or more processors to perform operations or functions associated with the autonomous platform 110, including implementing its autonomy system(s).

Figure 2:
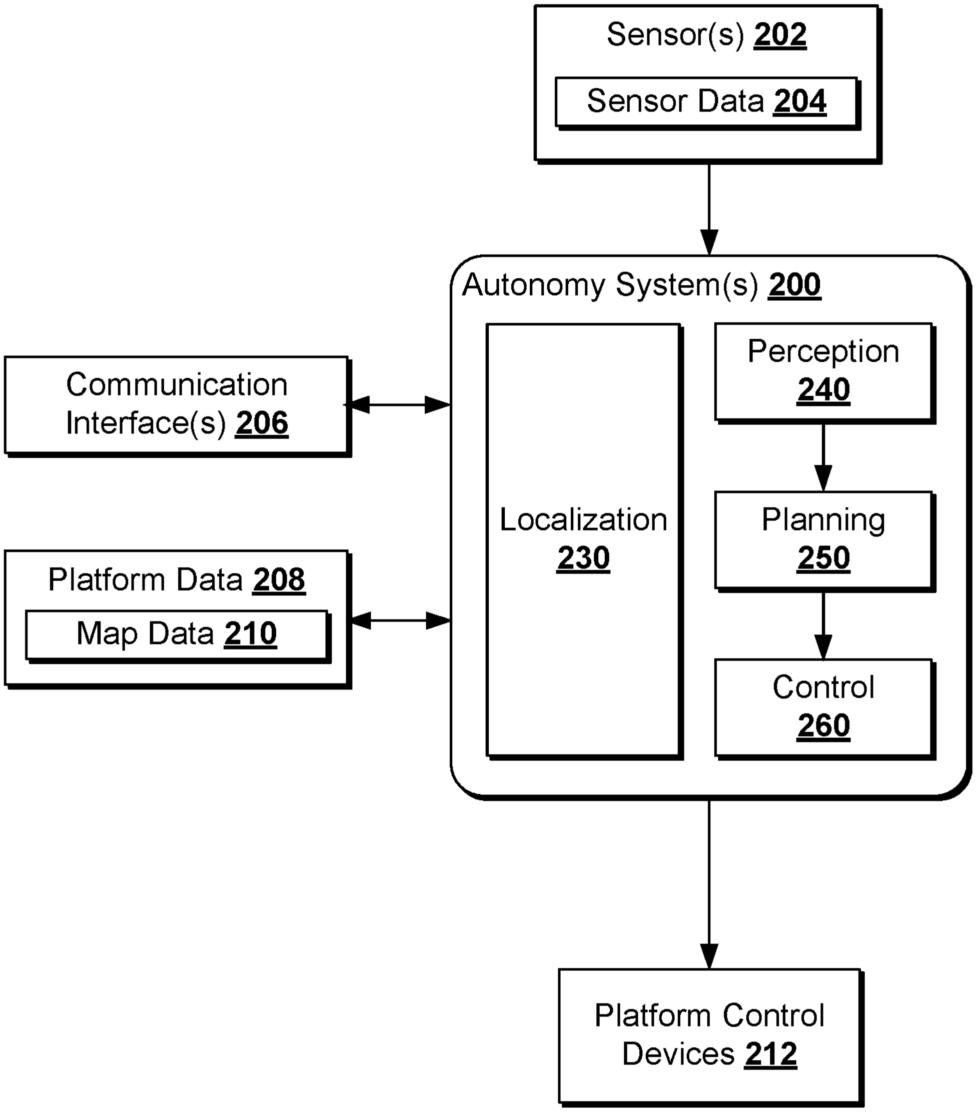
FIG. 2 is a block diagram of an example autonomy system for an autonomous platform according to some implementations of the present disclosure.

FIG. 2 is a block diagram of example autonomy system(s) 200 for an autonomous platform according to example implementations of the present disclosure. In some implementations, the autonomy system(s) 200 can be implemented by a computing system of an autonomous platform (e.g., the onboard computing system(s) 180 of the autonomous platform 110). For instance, the autonomy system(s) 200 can operate to obtain inputs from sensor(s) 202 or other input devices. In some implementations, the autonomy system(s) 200 can obtain (e.g., access, store, etc.) platform data 208 (e.g., map data 210). The autonomy system(s) 200 can generate control outputs for controlling the autonomous platform (e.g., through platform control devices 212, etc.) based on sensor data 204, map data 210, or other data. The autonomy system(s) 200 can include different subsystems for performing various autonomy operations. For example, autonomy operation subsystems can include a localization system 230, a perception system 240, a planning system 250, and a control system 260. For instance, the localization system 230 can provide an autonomous platform with an understanding of its position in an environment; the perception system 240 can provide for an autonomous platform's detection, understanding, and tracking of its environment (e.g., environmental features, objects in an environment, etc.); the planning system 250 can provide for determining how the autonomous platform is to interact with and in its environment; and the control system 260 can provide for an interface between the autonomy system(s) 200 and the platform control devices 212 for controlling the autonomous platform. The autonomy system(s) 200 can be implemented by one or more onboard computing system(s). The subsystems can include one or more processors and one or more memory devices. The one or more memory devices can store instructions executable by the one or more processors to cause the one or more processors to perform operations or functions associated with the subsystems. The computing resources of the autonomy system(s) 200 can be shared among its subsystems, or a subsystem can have a set of dedicated computing resources.

In some implementations, the autonomy system(s) 200 can be implemented for or by an autonomous vehicle (e.g., a ground-based autonomous vehicle). For example, the autonomy system(s) 200 can perform various processing techniques on inputs (e.g., the sensor data 204, the map data 210) to perceive and understand the vehicle's surrounding environment and generate an appropriate set of control outputs to implement a vehicle motion plan (e.g., including one or more trajectories) for traversing the vehicle's surrounding environment (e.g., environment 100 of FIG. 1, etc.). In some implementations, an autonomous vehicle implementing the autonomy system(s) 200 can drive, navigate, operate, etc. with minimal or no interaction from a human operator (e.g., driver, pilot, etc.).

In some implementations, the autonomous platform can be configured to operate in a plurality of operating modes. For instance, the autonomous platform can be configured to operate in a fully autonomous (e.g., self-driving, etc.) operating mode in which the autonomous platform is controllable without user input (e.g., can drive and navigate with no input from a human operator present in the autonomous vehicle or remote from the autonomous vehicle, etc.). The autonomous platform can operate in a semi-autonomous operating mode in which the autonomous platform can operate with some input from a human operator present in the autonomous platform (or a human operator that is remote from the autonomous platform). In some implementations, the autonomous platform can enter into a manual operating mode in which the autonomous platform is fully controllable by a human operator (e.g., human driver, etc.) and can be prohibited or disabled (e.g., temporary, permanently, etc.) from performing autonomous navigation (e.g., autonomous driving, etc.). The autonomous platform can be configured to operate in other modes such as, for example, park or sleep modes (e.g., for use between tasks such as waiting to provide a trip/service, recharging, etc.). In some implementations, the autonomous platform can implement vehicle operating assistance technology (e.g., collision mitigation system, power assist steering, etc.), for example, to help assist the human operator of the autonomous platform (e.g., while in a manual mode, etc.).

The autonomy system(s) 200 can be located onboard (e.g., on or within) an autonomous platform and can be configured to operate the autonomous platform in various environments. In some implementations, this can be a real-world environment. In some implementations, the autonomy system(s) 200 or its functionality can be utilized for a simulation. This can include, for example, simulating the operation of a simulated autonomous platform within a simulated environment or operational scenario. In some implementations, one or more simulation computing devices can simulate one or more of: the sensors 202, the sensor data 204, communication interface(s) 206, the platform data 208, or the platform control devices 212 for simulating operation of the autonomy system(s) 200.

In some implementations, the autonomy system(s) 200 can communicate with one or more networks or other systems with the communication interface(s) 206. The communication interface(s) 206 can include any suitable components for interfacing with one or more network(s) (e.g., the network(s) 170 of FIG. 1, etc.), including, for example, transmitters, receivers, ports, controllers, antennas, or other suitable components that can help facilitate communication. In some implementations, the communication interface(s) 206 can include a plurality of components (e.g., antennas, transmitters, or receivers, etc.) that allow it to implement and utilize various communication techniques (e.g., multiple-input, multiple-output (MIMO) technology, etc.).

In some implementations, the autonomy system(s) 200 can use the communication interface(s) 206 to communicate with one or more computing devices that are remote from the autonomous platform (e.g., the remote system(s) 160) over one or more network(s) (e.g., the network(s) 170). For instance, in some examples, one or more inputs, data, or functionalities of the autonomy system(s) 200 can be supplemented or substituted by a remote system communicating over the communication interface(s) 206. For instance, in some implementations, the map data 210 can be downloaded over a network to a remote system using the communication interface(s) 206. In some examples, one or more of the localization system 230, the perception system 240, the planning system 250, or the control system 260 can be updated, influenced, nudged, communicated with, etc. by a remote system for assistance, maintenance, situational response override, management, etc.

The sensor(s) 202 can be located onboard the autonomous platform. In some implementations, the sensor(s) 202 can include one or more types of sensor(s). For instance, one or more sensors can include image capturing device(s) (e.g., visible spectrum cameras, infrared cameras, etc.). In addition, or alternatively, the sensor(s) 202 can include one or more depth capturing device(s). For example, the sensor(s) 202 can include one or more Light Detection and Ranging (LIDAR) sensor(s) or Radio Detection and Ranging (RADAR) sensor(s). The sensor(s) 202 can be configured to generate point data descriptive of at least a portion of a three-hundred-and-sixty-degree view of the surrounding environment. The point data can be point cloud data (e.g., three-dimensional LIDAR point cloud data, RADAR point cloud data). In some implementations, one or more of the sensor(s) 202 for capturing depth information can be fixed to a rotational device in order to rotate the sensor(s) 202 about an axis. The sensor(s) 202 can be rotated about the axis while capturing data in interval sector packets descriptive of different portions of a three-hundred-and-sixty-degree view of a surrounding environment of the autonomous platform. In some implementations, one or more of the sensor(s) 202 for capturing depth information can be solid state.

The sensor(s) 202 can be configured to capture the sensor data 204 indicative of or otherwise associated with at least a portion of the environment of the autonomous platform. The sensor data 204 can include image data (e.g., 2D camera data, video data, etc.), RADAR data, LIDAR data (e.g., 3D point cloud data, etc.), audio data, or other types of data. In some implementations, the autonomy system(s) 200 can obtain input from additional types of sensors, such as inertial measurement units, altimeters, inclinometers, odometry devices, location or positioning devices (e.g., GPS, compass), or other types of sensors. In some implementations, the autonomy system(s) 200 can obtain sensor data 204 associated with particular component(s) or system(s) of an autonomous platform. This sensor data 204 can be indicative of, for example, wheel speed, component temperatures, steering angle, cargo or passenger status, etc. In some implementations, the autonomy system(s) 200 can obtain sensor data 204 associated with ambient conditions, such as environmental or weather conditions. In some implementations, the sensor data 204 can include multi-modal sensor data. The multi-modal sensor data can be obtained by at least two different types of sensor(s) (e.g., of the sensors 202) and can be indicative of static object(s) or actor(s) within an environment of the autonomous platform. The multi-modal sensor data can include at least two types of sensor data fused together (e.g., camera and LIDAR data). In some implementations, the autonomous platform can utilize the sensor data 204 for sensors that are remote from (e.g., offboard) the autonomous platform. This can include for example, sensor data 204 captured by a different autonomous platform. Some example aspects of the present disclosure make reference to sweeps of sensor data. A sweep of sensor data can refer to, for example, a set of related sensor data 204. A single sweep of sensor data 204 can be or include a single image, a single pass of a sensor 202 throughout a portion of the environment, a single measurement, etc. and/or can include some or all sensor data captured at a given point of time, at a given measurement query, or any other suitable form of sweeping sensor data.

The autonomy system(s) 200 can obtain the map data 210 associated with an environment in which the autonomous platform was, is, or will be located. The map data 210 can provide information about an environment or a geographic area. For example, the map data 210 can provide information regarding the identity and location of different travel ways (e.g., roadways, etc.), travel way segments (e.g., road segments, etc.), buildings, or other items or objects (e.g., lampposts, crosswalks, curbs, etc.); the location and directions of boundaries or boundary markings (e.g., the location and direction of traffic lanes, parking lanes, turning lanes, bicycle lanes, other lanes, etc.); traffic control data (e.g., the location and instructions of signage, traffic lights, other traffic control devices, etc.); obstruction information (e.g., temporary or permanent blockages, etc.); event data (e.g., road closures/traffic rule alterations due to parades, concerts, sporting events, etc.); nominal vehicle path data (e.g., indicative of an ideal vehicle path such as along the center of a certain lane, etc.); or any other map data that provides information that assists an autonomous platform in understanding its surrounding environment and its relationship thereto. In some implementations, the map data 210 can include high-definition map information. Additionally, or alternatively, the map data 210 can include sparse map data (e.g., lane graphs, etc.).

The autonomy system(s) 200 can include the localization system 230, which can provide an autonomous platform with an understanding of its position in an environment. In some examples, the localization system 230 can support one or more other subsystems of the autonomy system(s) 200, such as by providing a unified local reference frame for performing, e.g., perception operations, planning operations, or control operations.

In some implementations, the localization system 230 can determine a current position of an autonomous platform. A current position can include a global position (e.g., respecting a georeferenced anchor, etc.) or relative position (e.g., respecting objects in the environment, etc.). The localization system 230 can generally include or interface with any device or circuitry for analyzing a position or change in position of an autonomous platform (e.g., autonomous ground-based vehicle, etc.). For example, the localization system 230 can determine position by using one or more of: inertial sensors (e.g., inertial measurement unit(s), etc.), a satellite positioning system, radio receivers, networking devices (e.g., based on IP address, etc.), triangulation or proximity to network access points or other network components (e.g., cellular towers, Wi-Fi access points, etc.), or other suitable techniques. The position of the autonomous platform can be used by various subsystems of the autonomy system(s) 200 or provided to a remote computing system (e.g., using the communication interface(s) 206).

In some implementations, the localization system 230 can register relative positions of elements of a surrounding environment of an autonomous platform with recorded positions in the map data 210. For instance, the localization system 230 can process the sensor data 204 (e.g., LIDAR data, RADAR data, camera data, etc.) for aligning or otherwise registering to a map of the surrounding environment (e.g., from the map data 210) to understand the autonomous platform's position within that environment. Accordingly, in some implementations, the autonomous platform can identify its position within the surrounding environment (e.g., across six axes, etc.) based on a search over the map data 210. In some implementations, given an initial location, the localization system 230 can update the autonomous platform's location with incremental re-alignment based on recorded or estimated deviations from the initial location. In some implementations, a position can be registered directly within the map data 210.

In some implementations, the map data 210 can include a large volume of data subdivided into geographic tiles, such that a desired region of a map stored in the map data 210 can be reconstructed from one or more tiles. For instance, a plurality of tiles selected from the map data 210 can be stitched together by the autonomy system(s) 200 based on a position obtained by the localization system 230 (e.g., a number of tiles selected in the vicinity of the position).

In some implementations, the localization system 230 can determine positions (e.g., relative or absolute) of one or more attachments or accessories for an autonomous platform. For instance, an autonomous platform can be associated with a cargo platform, and the localization system 230 can provide positions of one or more points on the cargo platform. For example, a cargo platform can include a trailer or other device towed or otherwise attached to or manipulated by an autonomous platform, and the localization system 230 can provide for data describing the position (e.g., absolute, relative, etc.) of the autonomous platform as well as the cargo platform. Such information can be obtained by the other autonomy systems to help operate the autonomous platform.

The autonomy system(s) 200 can include the perception system 240, which can allow an autonomous platform to detect, understand, and track its environment. Environmental features or objects perceived within an environment can be those within the field of view of the sensor(s) 202 or predicted to be occluded from the sensor(s) 202. This can include object(s) not in motion or not predicted to move (static objects) or object(s) in motion or predicted to be in motion (dynamic objects/actors).

For instance, the perception system 240 can determine one or more states (e.g., current or past state(s), etc.) of one or more objects that are within a surrounding environment of an autonomous platform. For example, state(s) can describe (e.g., for a given time, time period, etc.) an estimate of an object's current or past location (also referred to as position); current or past speed/velocity; current or past acceleration; current or past heading; current or past orientation; size/footprint (e.g., as represented by a bounding shape, object highlighting, etc.); classification (e.g., pedestrian class vs. vehicle class vs. bicycle class, etc.); the uncertainty scores associated therewith; or other state information. In some implementations, the perception system 240 can determine the state(s) using one or more algorithms or machine-learned models configured to identify/classify objects based on inputs from the sensor(s) 202. In some implementations, state(s) for one or more identified or unidentified objects can be maintained and updated over time as the autonomous platform continues to perceive or interact with the objects (e.g., maneuver with or around, yield to, etc.). In this manner, the perception system 240 can provide an understanding about a current state of an environment (e.g., including the objects therein, etc.) informed by a record of prior states of the environment (e.g., including movement histories for the objects therein). Such information can be helpful as the autonomous platform plans its motion through the environment.

According to example aspects of the present disclosure, in addition to and/or alternatively to predicting the one or more states associated with the one or more objects, the perception system 240 can predict one or more predicted future velocities associated with the one or more objects in the surrounding environment. The predicted future velocities can represent predicted future velocity associated with the one or more objects at one or more discrete future time steps. In some implementations, the discrete future time steps can be in fixed or varied increments (e.g., 0.1 s, 0.5 s, 1.0 s) from a current time up to a prediction end time occurring at a given amount of time in the future (e.g., 200 ms, 500 ms, 1 ms, 2 ms, 3 ms, 5 ms after the current time). The predicted future velocity(s) can have an associated uncertainty score indicative of a confidence of the predicted future velocity. The uncertainty score can be associated with the prediction over some or all time steps and/or with a particular time step.

The current and/or past speed/velocity and/or the one or more predicted future velocities that are predicted by the perception system 240 can include longitudinal (e.g., along-track) velocities, lateral (e.g., cross-track) velocities, and/or other types of angular velocities that are determined relative to one or more specific orientations. Longitudinal, or along-track, velocity can refer to a velocity along (e.g., in a direction of/defined by) a track, such as a velocity along a current heading of an autonomous platform, a predetermined track such as a center of a lane, or other suitable track. Similarly, lateral, or cross-track velocity, can refer to a velocity across (e.g., perpendicular to a direction of/defined by) the track. Either or both of longitudinal velocity and/or lateral velocity can be regressed through perception system 240 to produce predicted future velocities as described herein. The parameters predicted by perception system 240 are also not limited to velocities. For example, perception system 240 can be configured to determine predicted future acceleration, jerk, or other higher order output parameters. Predicted future acceleration, jerk, and/or other higher order output parameters can also be predicted in terms of a longitudinal, lateral, or other angular parameter.

The autonomy system(s) 200 can include a planning system 250, which can be configured to determine how the autonomous platform is to interact with and move within its environment. The planning system 250 can determine one or more motion plans for an autonomous platform. A motion plan can include one or more trajectories (e.g., motion trajectories) that indicate a path for an autonomous platform to follow. A trajectory can be of a certain length or time range. The length or time range can be defined by the computational planning horizon of the planning system 250. A motion trajectory can be defined by one or more waypoints (with associated coordinates). The waypoint(s) can be future location(s) for the autonomous platform. The motion plans can be continuously generated, updated, and considered by the planning system 250.

To help with its motion planning decisions, the planning system 250 can be configured to perform a forecasting function. In some implementations, forecasting can include determining one or more strategies for the autonomous platform to move through its environment. A strategy can include one or more discrete decisions, such as interpretable decisions (e.g., yield to an actor, merge behind an actor, etc.). In some implementations, discrete decision(s) can be amenable to interpretable constraints, such that invalid strategies can be eliminated from consideration under interpretable guidelines.

The planning system 250 can forecast future state(s) of the environment based on one or more strategies for the autonomous platform. This can include forecasting future state(s) of the autonomous platform or other actors in the environment. In some implementations, the planning system 250 can forecast future state(s) based on current or past state(s) (e.g., as developed or maintained by the perception system 240) in addition to and/or in the alternative to the predicted future velocity(s) from the perception system 240. In some implementations, future state(s) can be or include forecasted trajectories (e.g., positions over time) of the autonomous platform or objects in the environment, such as other actors. In some implementations, one or more of the future state(s) can include one or more probabilities associated therewith (e.g., marginal probabilities, conditional probabilities). For example, the one or more probabilities can include one or more probabilities conditioned on strategy or trajectory options available to the autonomous platform. Additionally, or alternatively, the probabilities can include probabilities conditioned on trajectory options available to one or more other actors.

In some implementations, the planning system 250 can provide for an interactive approach for generating and controlling movement of the autonomous platform through its environment. The planning system 250 can determine a motion plan for an autonomous platform with an understanding of how forecasted future states of the environment can be affected by execution of one or more candidate motion plans. By way of example, with reference again to FIG. 1, the autonomous platform 110 can determine candidate motion plans corresponding to a set of platform trajectories 112A-C that respectively correspond to the first actor trajectories 122A-C for the first actor 120, trajectories 132 for the second actor 130, and trajectories 142 for the third actor 140 (e.g., with respective trajectory correspondence indicated with matching line styles). For instance, the autonomous platform 110 (e.g., using its autonomy system(s) 200) can forecast that a platform trajectory 112A to more quickly move the autonomous platform 110 into the area in front of the first actor 120 is likely associated with the first actor 120 decreasing forward speed and yielding more quickly to the autonomous platform 110 in accordance with first actor trajectory 122A. Additionally, or alternatively, the autonomous platform 110 can forecast that a platform trajectory 112B to gently move the autonomous platform 110 into the area in front of the first actor 120 is likely associated with the first actor 120 slightly decreasing speed and yielding slowly to the autonomous platform 110 in accordance with first actor trajectory 122B. Additionally, or alternatively, the autonomous platform 110 can forecast that a platform trajectory 112C to remain in a parallel alignment with the first actor 120 is likely associated with the first actor 120 not yielding any distance to the autonomous platform 110 in accordance with first actor trajectory 122C. Based on comparison of the forecasted scenarios to a set of desired outcomes (e.g., by scoring scenarios based on a cost or reward), the planning system 250 can select a motion plan (and its associated trajectory) in view of the autonomous platform's interaction with the environment 100. In this manner, for example, the autonomous platform 110 can interleave its forecasting and motion planning functionality.

Returning to FIG. 2, in some implementations, the planning system 250 can determine a desired trajectory for executing a desired strategy. For instance, the planning system 250 can obtain one or more trajectories for executing one or more strategies. The planning system 250 can evaluate trajectories or strategies (e.g., with scores, costs, rewards, constraints, etc.) and rank them. For instance, the planning system 250 can use forecasting output(s) that indicate interactions (e.g., proximity, intersections, etc.) between trajectories for the autonomous platform and one or more objects to inform the evaluation of candidate trajectories or strategies for the autonomous platform. In some implementations, the planning system 250 can utilize static cost(s) to evaluate trajectories or strategies for the autonomous platform (e.g., "avoid lane boundaries," "minimize jerk," etc.). In addition, or alternatively, the planning system 250 can utilize dynamic cost(s) to evaluate the trajectories or strategies for the autonomous platform based on forecasted outcomes for the current operational scenario (e.g., forecasted trajectories or strategies leading to interactions between actors, forecasted trajectories or strategies leading to interactions between actors and the autonomous platform, etc.). The planning system 250 can rank trajectories or strategies based on one or more static costs, one or more dynamic costs, or a combination thereof. The planning system 250 can select a motion plan (and a corresponding trajectory) based on a ranking of a plurality of candidates. In some implementations, the planning system 250 can select a highest ranked candidate, or a highest ranked feasible candidate.

To implement selected motion plan(s), the autonomy system(s) 200 can include a control system 260 (e.g., a vehicle control system). Generally, the control system 260 can provide an interface between the autonomy system(s) 200 and the platform control devices 212 for implementing the strategies and motion plan(s) generated by the planning system 250. For instance, the control system 260 can implement the selected motion plan/trajectory to control the autonomous platform's motion through its environment by following the selected trajectory (e.g., the waypoints included therein). The control system 260 can, for example, translate a motion plan into instructions for the appropriate platform control devices 212 (e.g., acceleration control, brake control, steering control, etc.). By way of example, the control system 260 can translate a selected motion plan into instructions to adjust a steering component (e.g., a steering angle) by a certain number of degrees, apply a certain magnitude of braking force, increase/decrease speed, etc. In some implementations, the control system 260 can communicate with the platform control devices 212 through communication channels including, for example, one or more data buses (e.g., controller area network (CAN), etc.), onboard diagnostics connectors (e.g., OBD-II, etc.), or a combination of wired or wireless communication links. The platform control devices 212 can send or obtain data, messages, signals, etc. to or from the autonomy system(s) 200 (or vice versa) through the communication channel(s).

The autonomy system(s) 200 (and their software) can be platform agnostic, and the control system 260 can provide control instructions to platform control devices 212 for a variety of different platforms for autonomous movement (e.g., a plurality of different autonomous platforms fitted with autonomous control systems). This can include a variety of different types of autonomous vehicles (e.g., sedans, vans, SUVs, trucks, electric vehicles, combustion power vehicles, etc.) from a variety of different manufacturers/developers that operate in various different environments and, in some implementations, perform one or more vehicle services.

Figure 3A:
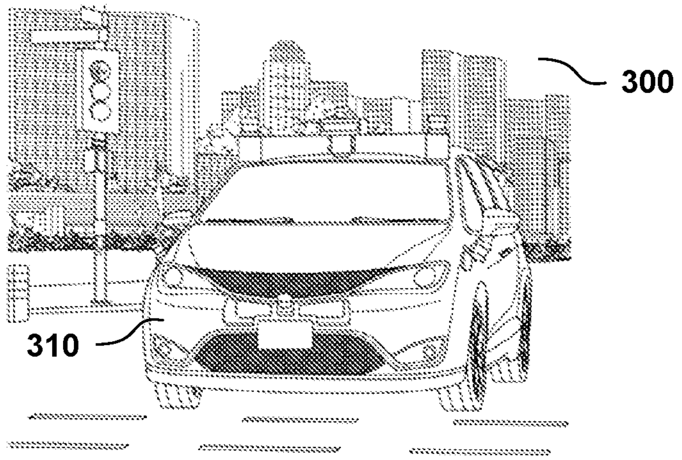
FIGS. 3A-3D are example operational environments for an autonomous platform according to some implementations of the present disclosure.

For example, with reference to FIG. 3A, an operational environment can include a dense environment 300. An autonomous platform can include an autonomous vehicle 310 controlled by the autonomy system(s) 200. In some implementations, the autonomous vehicle 310 can be configured for maneuverability in a dense environment, such as with a configured wheelbase or other specifications. In some implementations, the autonomous vehicle 310 can be configured for transporting cargo or passengers. In some implementations, the autonomous vehicle 310 can be configured to transport numerous passengers (e.g., a passenger van, a shuttle, a bus, etc.). In some implementations, the autonomous vehicle 310 can be configured to transport cargo, such as large quantities of cargo (e.g., a truck, a box van, a step van, etc.) or smaller cargo (e.g., food, personal packages, etc.).

Figure 3B:
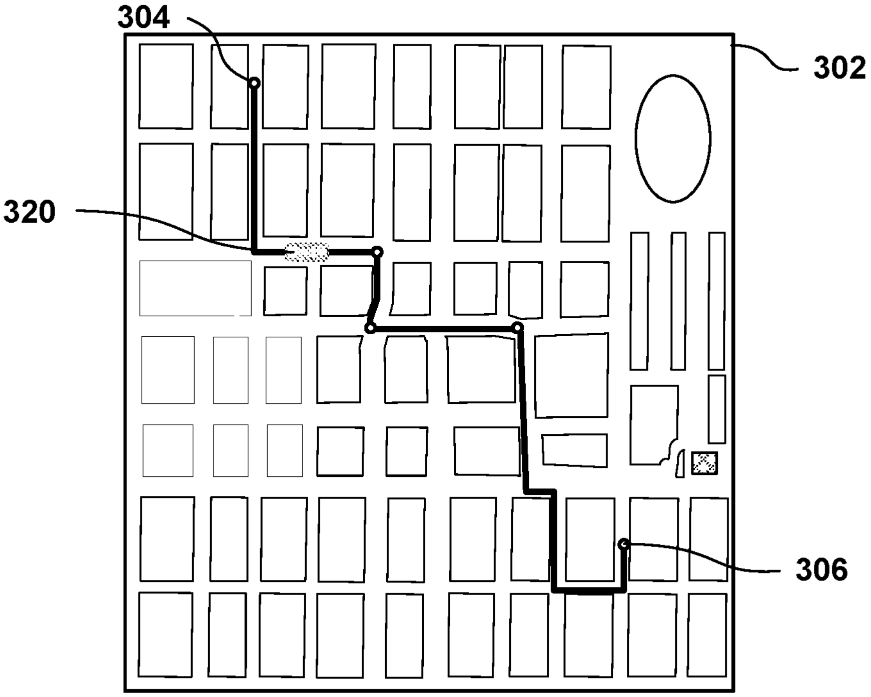

With reference to FIG. 3B, a selected overhead view 305 of the dense environment 300 is shown overlaid with an example trip/service between a first location 304 and a second location 306. The example trip/service can be assigned, for example, to an autonomous vehicle 320 by a remote computing system. The autonomous vehicle 320 can be, for example, the same type of vehicle as autonomous vehicle 310. The example trip/service can include transporting passengers or cargo between the first location 304 and the second location 306. In some implementations, the example trip/service can include travel to or through one or more intermediate locations, such as to onload or offload passengers or cargo. In some implementations, the example trip/service can be prescheduled (e.g., for regular traversal, such as on a transportation schedule). In some implementations, the example trip/service can be on-demand (e.g., as requested by or for performing a taxi, rideshare, ride hailing, courier, delivery service, etc.).

Figure 3C:
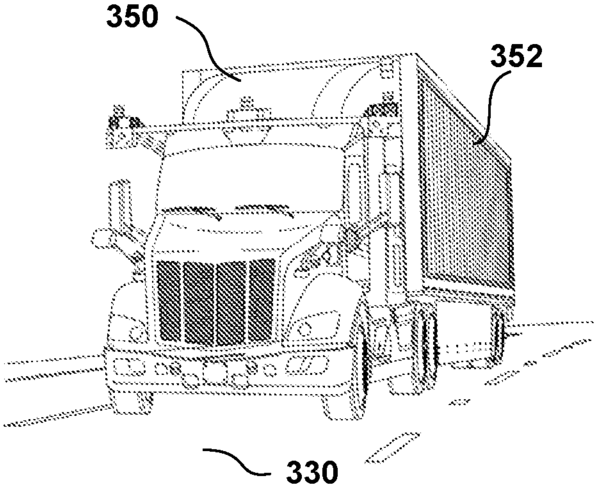

With reference to FIG. 3C, in another example, an operational environment can include an open travel way environment 330. An autonomous platform can include an autonomous vehicle 350 controlled by the autonomy system(s) 200. This can include an autonomous tractor for an autonomous truck. In some implementations, the autonomous vehicle 350 can be configured for high payload transport (e.g., transporting freight or other cargo or passengers in quantity), such as for long distance, high payload transport. For instance, the autonomous vehicle 350 can include one or more cargo platform attachments such as a trailer 352. Although depicted as a towed attachment in FIG. 3C, in some implementations one or more cargo platforms can be integrated into (e.g., attached to the chassis of, etc.) the autonomous vehicle 350 (e.g., as in a box van, step van, etc.).

Figure 3D:
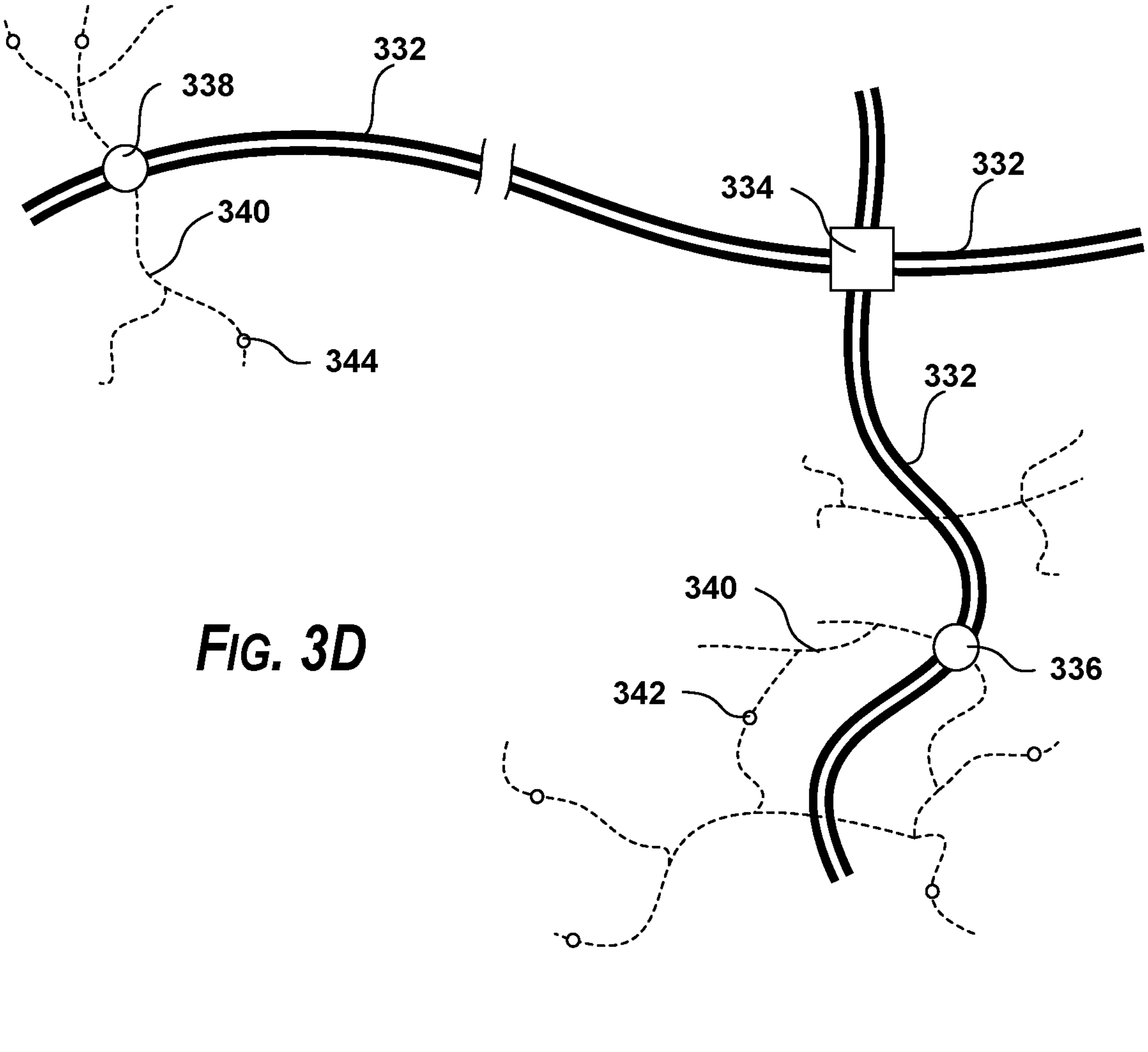

With reference to FIG. 3D, a selected overhead view of open travel way environment 330 is shown, including travel ways 332, an interchange 334, transfer hubs 336 and 338, access travel ways 340, and locations 342 and 344. In some implementations, an autonomous vehicle (e.g., the autonomous vehicle 310 or the autonomous vehicle 350) can be assigned an example trip/service to traverse the one or more travel ways 332 (optionally connected by the interchange 334) to transport cargo between the transfer hub 336 and the transfer hub 338. For instance, in some implementations, the example trip/service includes a cargo delivery/transport service, such as a freight delivery/transport service. The example trip/service can be assigned by a remote computing system. In some implementations, the transfer hub 336 can be an origin point for cargo (e.g., a depot, a warehouse, a facility, etc.) and the transfer hub 338 can be a destination point for cargo (e.g., a retailer, etc.). However, in some implementations, the transfer hub 336 can be an intermediate point along a cargo item's ultimate journey between its respective origin and its respective destination. For instance, a cargo item's origin can be situated along the access travel ways 340 at the location 342. The cargo item can accordingly be transported to the transfer hub 336 (e.g., by a human-driven vehicle, by the autonomous vehicle 310, etc.) for staging. At the transfer hub 336, various cargo items can be grouped or staged for longer distance transport over the travel ways 332.

In some implementations of an example trip/service, a group of staged cargo items can be loaded onto an autonomous vehicle (e.g., the autonomous vehicle 350) for transport to one or more other transfer hubs, such as the transfer hub 338. For instance, although not depicted, it is to be understood that the open travel way environment 330 can include more transfer hubs than the transfer hubs 336 and 338, and can include more travel ways 332 interconnected by more interchanges 334. A simplified map is presented here for purposes of clarity only. In some implementations, one or more cargo items transported to the transfer hub 338 can be distributed to one or more local destinations (e.g., by a human-driven vehicle, by the autonomous vehicle 310, etc.), such as along the access travel ways 340 to the location 344. In some implementations, the example trip/service can be prescheduled (e.g., for regular traversal, such as on a transportation schedule). In some implementations, the example trip/service can be on-demand (e.g., as requested by or for performing a chartered passenger transport or freight delivery service).

To help improve the performance of an autonomous platform, such as an autonomous vehicle controlled at least in part using autonomy system(s) 200 (e.g., the autonomous vehicles 310 or 350), systems and methods according to example aspects of the present disclosure can utilize perception systems including functionality for predicting future actor velocities. More particularly, multiple sweeps of sensor data (e.g., LIDAR data) can be captured and processed by the perception system to produce object data including data descriptive of one or more predicted future velocities of the objects in the environment of the vehicle. For instance, the predicted future velocity(s) can be predicted at one or more discrete future time steps. In some implementations, the discrete future time steps can be in fixed or varied increments (e.g., 0.1 s, 0.5 s, 1.0 s) from a current time up to a prediction end time occurring at a given amount of time in the future (e.g., 200 ms, 500 ms, 1 ms, 2 ms, 3 ms, 5 ms after the current time). The predicted future velocity(s) can have an associated uncertainty score indicative of a confidence of the predicted future velocity. The uncertainty score can be associated with the prediction over some or all time steps and/or with a particular time step. The predicted future velocities and the uncertainty scores can be passed to an object tracker model that predicts one or more smoothed velocity outputs associated with the objects in the environment of the vehicle. The smoothed velocity outputs can then be passed to a motion planning stage that determines a motion plan for the autonomous vehicle based at least in part on the smoothed velocity output(s). The motion plan can be executed by control systems onboard the vehicle to control various systems of the vehicle.

Figure 4:
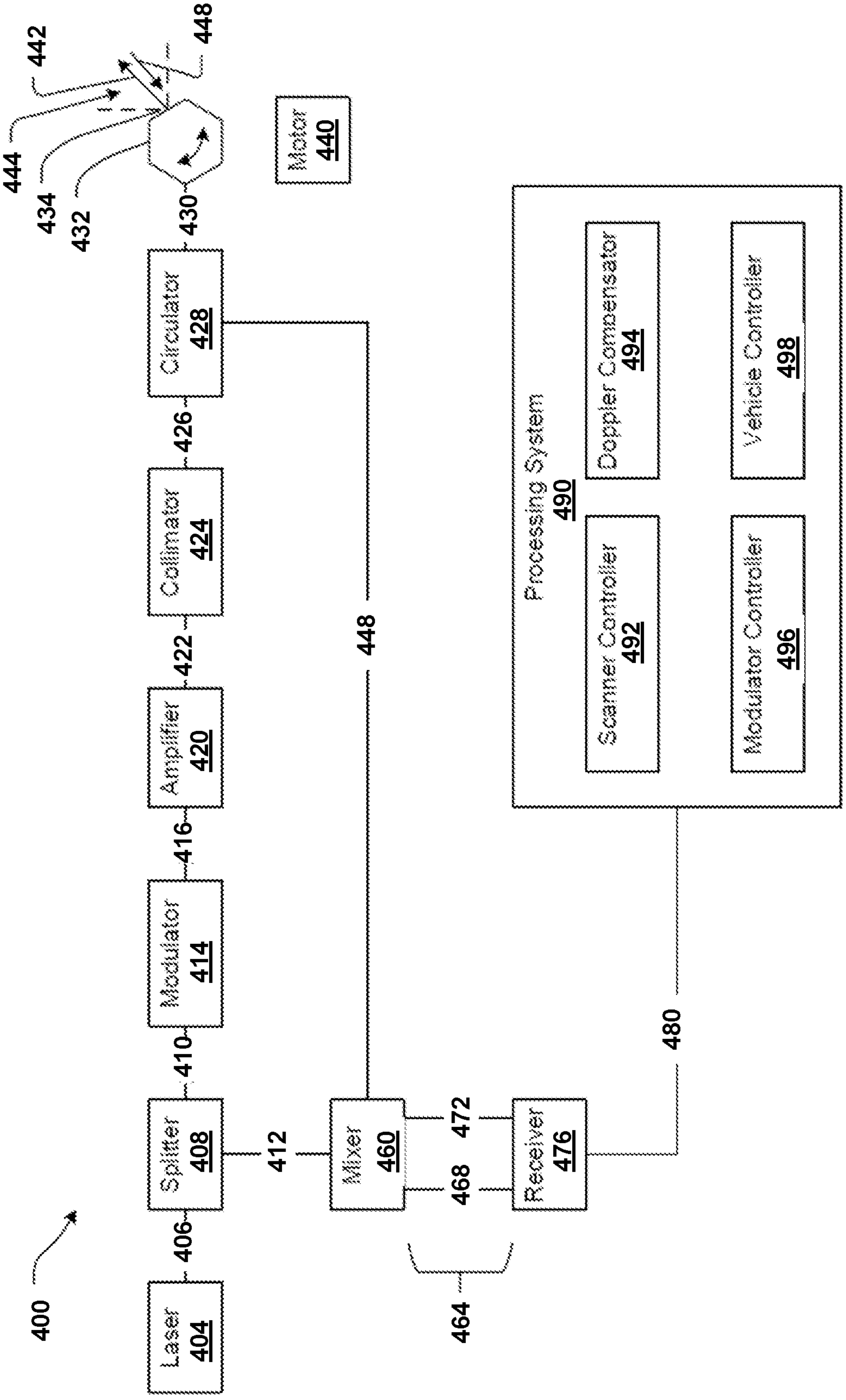
FIG. 4 is a block diagram of an example LIDAR system according to some implementations of the present disclosure.

Referring now to FIG. 4, block diagram of an example LIDAR system 400 in accordance with aspects of the present disclosure is depicted. LIDAR system 400 can be provided as one or more of the sensor(s) 202 depicted in FIG. 2. In some implementations, the LIDAR system 400 can use frequency modulation to encode an optical signal and scatter the encoded optical signal into free-space using optics. By detecting the frequency differences between the encoded optical signal and a returned signal reflected back from an object, the frequency modulated (FM) LIDAR system can determine the location of the object and/or precisely measure the velocity of the object using the Doppler effect. In some implementations, an FM LIDAR system may use a continuous wave (referred to as, "FMCW LIDAR") or a quasi-continuous wave (referred to as, "FMQW LIDAR"). In some implementations, the LIDAR system can use phase modulation (PM) to encode an optical signal and scatters the encoded optical signal into free space using optics.

In some instances, an object (e.g., a pedestrian wearing dark clothing) may have a low reflectivity, in that it only reflects back to the sensors (e.g., sensors 202 in FIG. 2) of the FM or PM LIDAR system a low amount (e.g., 10% or less) of the light that hit the object. In other instances, an object (e.g., a shiny road sign) may have a high reflectivity (e.g., above 10%), in that it reflects back to the sensors of the FM LIDAR system a high amount of the light that hit the object.

Regardless of the object's reflectivity, an FM LIDAR system may be able to detect (e.g., classify, recognize, discover, etc.) the object at greater distances (e.g., 2×) than a conventional LIDAR system. For example, an FM LIDAR system may detect a low reflectively object beyond 300 meters, and a high reflectivity object beyond 400 meters.

To achieve such improvements in detection capability, the FM LIDAR system may use sensors (e.g., sensors 202 in FIG. 2). In some implementations, these sensors can be single photon sensitive, meaning that they can detect the smallest amount of light possible. While an FM LIDAR system may, in some applications, use infrared wavelengths (e.g., 950 nm, 1550 nm, etc.), it is not limited to the infrared wavelength range (e.g., near infrared: 800 nm-1500 nm; middle infrared: 1500 nm-5600 nm; and far infrared: 5600 nm-1,000,000 nm). By operating the FM or PM LIDAR system in infrared wavelengths, the FM or PM LIDAR system can broadcast stronger light pulses or light beams than conventional LIDAR systems.

Thus, by detecting an object at greater distances, an FM LIDAR system may have more time to react to unexpected obstacles. Indeed, even a few milliseconds of extra time could improve response time and comfort, especially with heavy vehicles (e.g., commercial trucking vehicles) that are driving at highway speeds.

The FM LIDAR system can provide accurate velocity for each data point instantaneously. In some implementations, a velocity measurement is accomplished using the Doppler effect which shifts frequency of the light received from the object based at least one of the velocity in the radial direction (e.g., the direction vector between the object detected and the sensor) or the frequency of the laser signal. For example, for velocities encountered in on-road situations where the velocity is less than 100 meters per second (m/s), this shift at a wavelength of 1550 nanometers (nm) amounts to the frequency shift that is less than 130 megahertz (MHz). This frequency shift is small such that it is difficult to detect directly in the optical domain. However, by using coherent detection in FMCW, PMCW, or FMQW LIDAR systems, the signal can be converted to the RF domain such that the frequency shift can be calculated using various signal processing techniques. This enables the autonomous vehicle control system to process incoming data faster.

Instantaneous velocity calculation also makes it easier for the FM LIDAR system to determine distant or sparse data points as objects and/or track how those objects are moving over time. For example, an FM LIDAR sensor (e.g., within sensors 202 in FIG. 2) may only receive a few returns (e.g., hits) on an object that is 300 m away, but if those return give a velocity value of interest (e.g., moving towards the vehicle at >70 mph), then the FM LIDAR system and/or the autonomous vehicle control system may determine respective weights to probabilities associated with the objects.

Faster identification and/or tracking of the FM LIDAR system gives an autonomous vehicle control system more time to maneuver a vehicle. A better understanding of how fast objects are moving also allows the autonomous vehicle control system to plan a better reaction.

The FM LIDAR system can have less static compared to conventional LIDAR systems. That is, the conventional LIDAR systems that are designed to be more light-sensitive typically perform poorly in bright sunlight. These systems also tend to suffer from crosstalk (e.g., when sensors get confused by each other's light pulses or light beams) and from self-interference (e.g., when a sensor gets confused by its own previous light pulse or light beam). To overcome these disadvantages, vehicles using the conventional LIDAR systems often need extra hardware, complex software, and/or more computational power to manage this "noise."

In contrast, FM LIDAR systems do not suffer from these types of issues because each sensor is specially designed to respond only to its own light characteristics (e.g., light beams, light waves, light pulses). If the returning light does not match the timing, frequency, and/or wavelength of what was originally transmitted, then the FM sensor can filter (e.g., remove, ignore, etc.) out that data point. As such, FM LIDAR systems produce (e.g., generates, derives, etc.) more accurate data with less hardware or software requirements, enabling smoother driving.

The FM LIDAR system can be easier to scale than conventional LIDAR systems. As more self-driving vehicles (e.g., cars, commercial trucks, etc.) show up on the road, those powered by an FM LIDAR system likely will not have to contend with interference issues from sensor crosstalk. Furthermore, an FM LIDAR system uses less optical peak power than conventional LIDAR sensors. As such, some or all of the optical components for an FM LIDAR can be produced on a single chip, which produces its own benefits, as discussed herein.

Referring still to FIG. 4, the LIDAR system 400 can be used to determine parameters regarding objects, such as range and velocity, and output the parameters to a remote system. For example, the LIDAR system 400 can output the parameters for use by a vehicle controller that can control operation of a vehicle responsive to the received parameters (e.g., platform control devices 212) or a display that can present a representation of the parameters.

The LIDAR system 400 can be a coherent detection system. The LIDAR system 400 can be used to implement various features and components of the systems described with reference to FIGS. 1-3D. The LIDAR system 400 can include components for performing various detection approaches, such as to be operated as an amplitude modular LIDAR system or a coherent LIDAR system. The LIDAR system 400 can be used to perform time of flight range determination.

In some implementations, various components or combinations of components of the LIDAR system 400, such as laser source 404 and modulator 414, can be in a same housing, provided in a same circuit board or other electronic component, or otherwise integrated. In some implementations, various components or combinations of components of the LIDAR system 400 can be provided as separate components, such as by using optical couplings (e.g., optical fibers) for components that generate and/or receive optical signals, such as light beams, or wired or wireless electronic connections for components that generate and/or receive electrical (e.g., data) signals.

The LIDAR system 400 can include a laser source 404 that generates and emits a beam 406, such as a carrier wave light beam. A splitter 408 can split the beam 406 into a beam 410 and a reference beam 412 (e.g., reference signal). In some implementations, any suitable optical, electronic, or opto-electronic elements can be used to provide the beam 410 and the reference beam 412 from the laser source 404 to other elements.

A modulator 414 can modulate one or more properties of the input beam 410 to generate a beam 416 (e.g., target beam). In some implementations, the modulator 414 can modulate a frequency of the input beam 410 (e.g., optical frequency corresponding to optical wavelength, where $c=\lambda v$, where c is the speed of light, A is the wavelength, and v is the frequency). For example, the modulator 414 can modulate a frequency of the input beam 410 linearly such that a frequency of the beam 416 increases or decreases linearly over time. As another example, the modulator 414 can modulate a frequency of the input beam 410 non-linearly (e.g., exponentially). In some implementations, the modulator 414 can modulate a phase of the input beam 410 to generate the beam 416. However, the modulation techniques are not limited to the frequency modulation and the phase modulation. Any suitable modulation techniques can be used to modulate one or more properties of a beam.

Returning to FIG. 4, the modulator 414 can modulate the beam 410 subsequent to splitting of the beam 406 by the splitter 408, such that the reference beam 412 is unmodulated, or the modulator 414 can modulate the beam 406 and provide a modulated beam to the splitter 408 for the splitter 408 to split into a target beam and a reference beam.

The beam 416, which is used for outputting a transmitted signal, can have most of the energy of the beam 406 outputted by the laser source 404, while the reference beam 412 can have significantly less energy, yet sufficient energy to enable mixing with a return beam 448 (e.g., returned light) scattered from an object. The reference beam 412 can be used as a local oscillator (LO) signal. The reference beam 412 passes through a reference path and can be provided to a mixer 460. An amplifier 420 can amplify the beam 416 to output a beam 422, which a collimator 424 can collimate to output a beam 426.

As depicted in FIG. 4, a circulator 428 can be between the collimator 424 and optics 432 to receive the beam 426 and output a beam 430 to the optics 432. The circulator 428 can be between the laser source 404 and the collimator 424. The circulator 428 can receive return beam 448 from the optics 432 and provide the return beam 448 to the mixer 460. The optics 432 can be scanning optics, such as one or more polygon reflectors or deflectors to adjust the angle of received beams relative to outputted beams based on the orientation of outer surfaces (e.g., facets) of the optics relative to the received beam, or solid-state components (e.g., phased arrays, electro-optic crystals) configured to modify the direction of received light.

The optics 432 can define a field of view 444 that corresponds to angles scanned (e.g., swept) by the beam 442 (e.g., a transmitted beam). For example, the beam 442 can be scanned in the particular plane, such as an azimuth plane or elevation plane (e.g., relative to an object to which the LIDAR system 400 is coupled, such as an autonomous vehicle). The optics 432 can be oriented so that the field of view 444 sweeps an azimuthal plane relative to the optics 432.

At least one motor 440 can be coupled with the optics 432 to control at least one of a position or an orientation of the optics 432 relative to the beam 430. For example, where the optics 432 include a reflector or deflector, the motor 440 can rotate the optics 432 so that surfaces of the optics 432 at which the beam 430 is received vary in angle or orientation relative to the beam 430, causing the beam 442 to be varied in angle or direction as the beam 442 is outputted from the optics 432.

The beam 442 can be outputted from the optics 432 and reflected or otherwise scattered by an object (not shown) as a return beam 448 (e.g., return signal). The return beam 448 can be received on a reception path, which can include the circulator 428, and provided to the mixer 460.

The mixer 460 can be an optical hybrid, such as a 90-degree optical hybrid. The mixer 460 can receive the reference beam 412 and the return beam 448, and mix the reference beam 412 and the return beam 448 to output a signal 464 responsive to the reference beam 412 and the return beam 448. The signal 464 can include an in-phase (I) component 468 and a quadrature (Q) component 472.

The LIDAR system 400 can include a receiver 476 that receives the signal 464 from the mixer 460. The receiver 476 can generate a signal 480 responsive to the signal 464, which can be an electronic (e.g., radio frequency) signal. The receiver 476 can include one or more photodetectors that output the signal 480 responsive to the signal 464.

The LIDAR system 400 can include a processing system 490, which can be implemented using features of the computing system 180 of FIG. 1 or the autonomy system 200 of FIG. 2. The processing system 490 can process data received regarding the return beam 448, such as the signal 480, to determine parameters regarding the object such as range and velocity. The processing system 490 can include a scanner controller 492 that can provide scanning signals to control operation of the optics 432, such as to control the motor 440 to cause the motor 440 to rotate the optics 432 to achieve a target scan pattern, such as a sawtooth scan pattern or step function scan pattern. The processing system 490 can include a Doppler compensator 494 that can determine the sign and size of a Doppler shift associated with processing the return beam 448 and a corrected range based thereon along with any other corrections. The processing system 490 can include a modulator controller 496 that can send one or more electrical signals to drive the modulator 414.

The processing system 490 can include or be communicatively coupled with a vehicle controller 498 to control operation of a vehicle for which the LIDAR system 400 is installed (e.g., to provide complete or semi-autonomous control of the vehicle). For example, the vehicle controller 498 can be implemented by at least one of the LIDAR system 400 or control circuitry of the vehicle. The vehicle controller 498 can control operation of the vehicle responsive to at least one of a range to the object or a velocity of the object determined by the processing system 490. For example, the vehicle controller 498 can transmit a control signal to at least one of a steering system or a braking system of the vehicle to control at least one of speed or direction of the vehicle.

Figure 5:
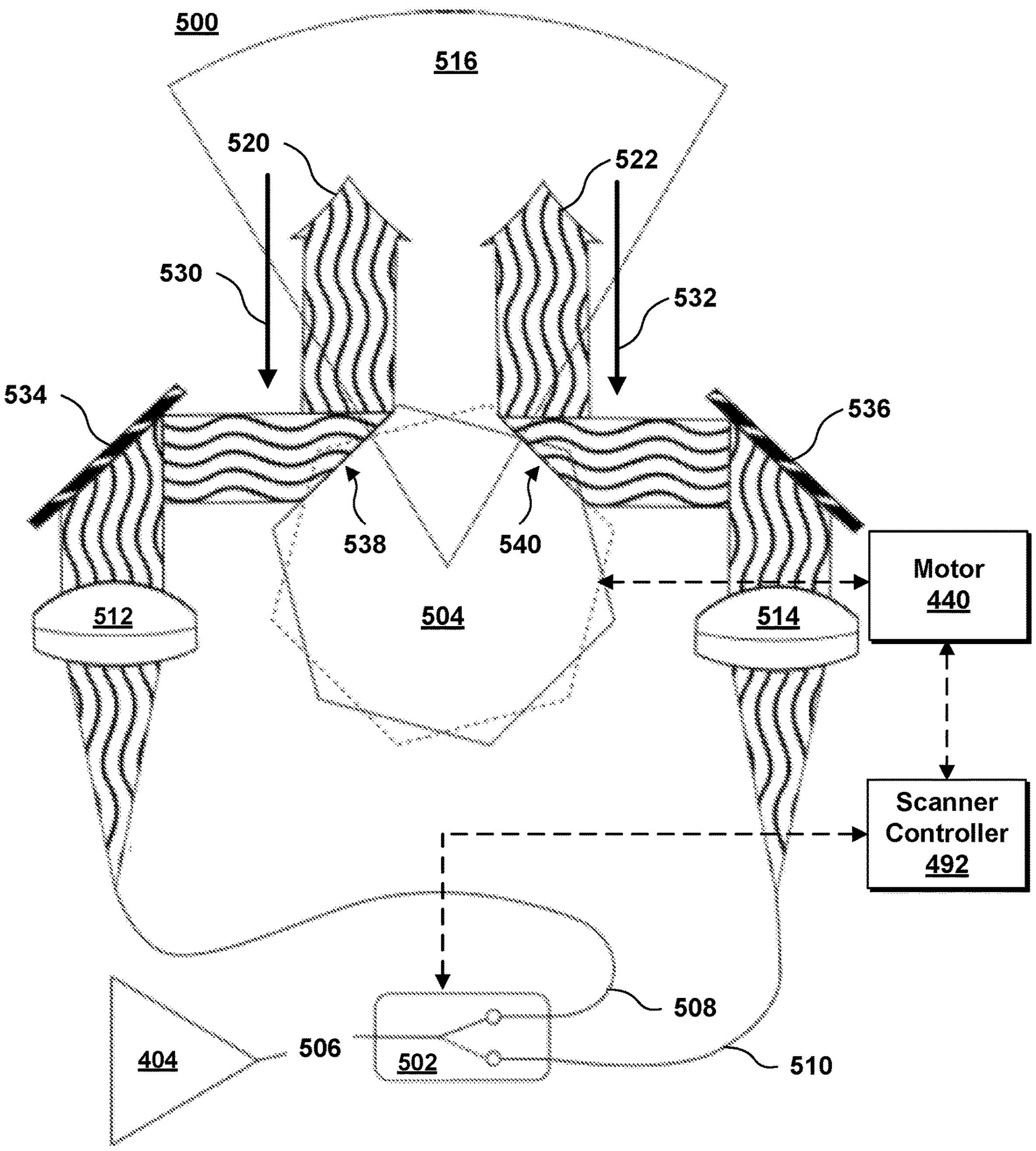
FIG. 5 is a block diagram of an example aperture-switching LIDAR system according to some implementations of the present disclosure.

FIG. 5 depicts an example of aperture-switching LIDAR system 500 for a scanner. LIDAR system 500 can be provided alone or in combination with one or more components of LIDAR system 400 of FIG. 4, for use within one or more of the sensor(s) 202 depicted in FIG. 2. Aperture-switching LIDAR system 500 can correspond, for example, to optics 432 of FIG. 4, with a portion of the additional components of LIDAR system 400 also depicted (e.g., motor 440 and scanner controller 492). The LIDAR system 400 of FIG. 4 can include one or more of the aperture-switching systems 500 depicted in FIG. 5. Additionally, because the aperture-switching system 500 of FIG. 5 results in two different beams 442 (e.g., transmitted beams) and two different return beams 448, it should be appreciated that one or more of the components illustrated in LIDAR system 400 of FIG. 4 can be duplicated for the respective apertures, transmitted beams and return beams realized by the aperture-switching system 500 of FIG. 5.

Referring more particularly to FIG. 5, an aperture-switching LIDAR system 500 according to example aspects of the present disclosure includes a laser source 404, a switch 502, and a polygon scanner 504. The laser source 404 is configured to generate a beam 506. The switch 502 (e.g., an optical switch) is coupled to the laser source 404 and configured to controllably channel the beam 506 from the laser source 404 into alternating first and second beam portions 508, 510. For example, the switch 502 is configured to alternately channel the first beam portion 508 through a first aperture 512 and the second beam portion 510 through a second aperture 514. The polygon scanner 504 can be configured to receive and reflect the alternating first and second beam portions 508, 510 during alternating and non-overlapping/non-concurrent first and second time windows in order to advantageously increase an effective duty cycle of the LIDAR system 500.

The alternating first and second beam portions 508, 510 can be transmitted by the polygon scanner 504 into a field of view 516 relative to the LIDAR system 500 as first transmitted beam 520 and second transmitted beam 522. Objects within the field of view 516 can reflect or otherwise scatter the first and second transmitted beams 520, 522 as corresponding first and second return beams 530, 532. The LIDAR system 500 can receive the return beams 530, 532 and process the return beams 530, 532 or characteristics thereof (e.g., by one or more components of LIDAR system 400) to determine object parameters regarding the object such as range, velocity, and Doppler information.

In some implementations, the aperture-switching LIDAR system 500 additionally includes first and second reflective surfaces 534, 536. The first reflective surface 534 is configured to receive the first beam portion 508 channeled through the first aperture 512 and to reflect the first beam portion 508 towards the polygon scanner 504 at a first angle (e.g., a first squint angle). The second reflective surface 536 is configured to receive the second beam portion 510 channeled through the second aperture 514 and to reflect the second beam portion 510 towards the polygon scanner 504 at a second angle (e.g., a second squint angle). The first and second (squint) angles correspond to the angle of beam portions coming into the polygon scanner 504 relative to the horizontal axis shown in FIG. 5. These first and second (squint) angles modify where the field of view (FoV) 516 of the two apertures 512, 514 are centered.

The polygon scanner 504 alternately receives the first beam portion 508 from the first reflective surface 534 at a first illumination location 538 and the second beam portion 510 from the second reflective surface 536 at a second illumination location 540. The first and second illumination locations 538, 540 are generally on opposite sides of the polygon scanner 504. Because of the geometry of the polygon scanner 504, the first and second beam portions 508, 510 received at the polygon scanner 504 are directed into an overlapping field of view 516 within the environment of the LIDAR system 500.

Figure 7:
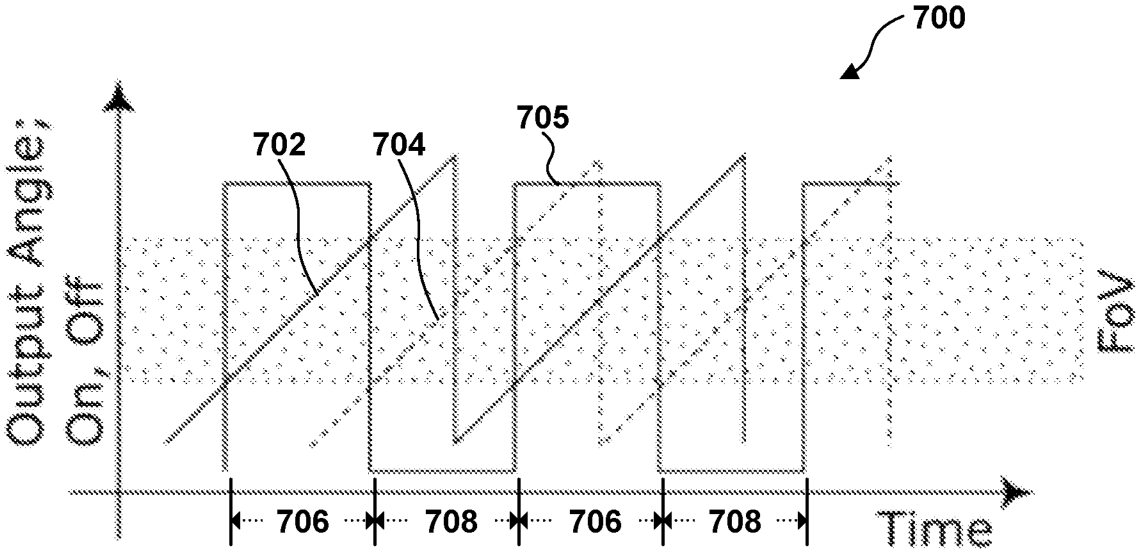
FIG. 7 is a timing diagram for an aperture-switching LIDAR system according to some implementations of the present disclosure.

Motion of the rotating optical structure embodied by polygon scanner 504 can be controlled by motor 440 to control at least one of: (i) a position, or (ii) an orientation, of the rotating optical structure relative to the first and second beam portions 508, 510 directed thereto. For example, scanner controller 492 can be coupled to motor 440 of the polygon scanner 504 and to the switch 502. The scanner controller 492 is configured to control a timing of the switch 502 and a timing of the motor 440 and coupled polygon scanner 504 to configure the switch 502 to: (i) channel the first beam portion 508 through the first aperture 512 during a facet break region of the polygon scanner 504 relative to the second aperture 514; and (ii) channel the second beam portion 510 through the second aperture 514 during a facet break region of the polygon scanner 504 relative to the first aperture 512. Additional details of a timing sequence for the aperture-switching LIDAR system 500 are depicted in FIG. 7.

Figure 6:
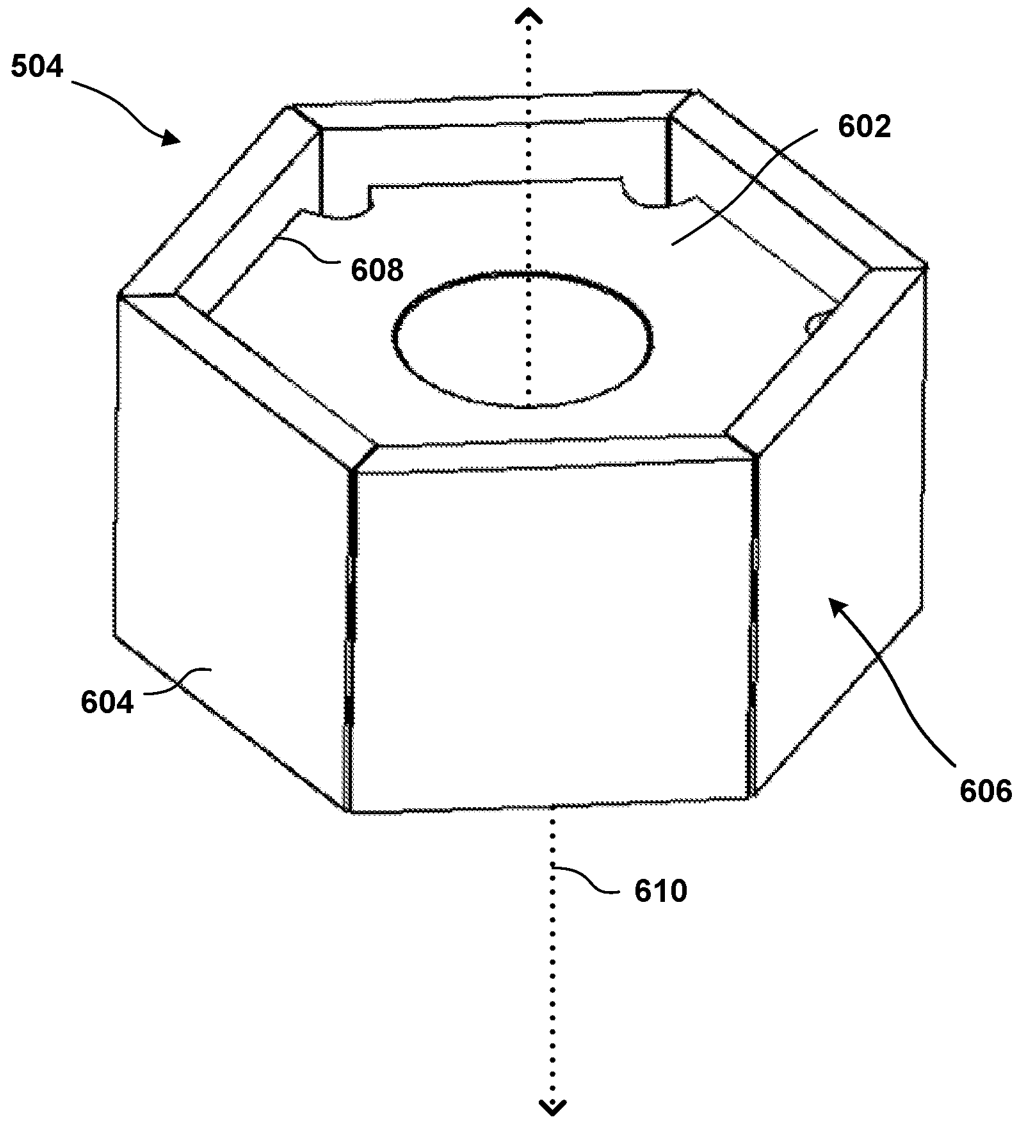
FIG. 6 is a perspective view of an example of a polygon scanner for use in a LIDAR system according to some implementations of the present disclosure.

FIG. 6 depicts additional example details of a polygon scanner 504. In some implementations, the polygon scanner 504 includes a frame 602 and a plurality of mirrors 604 coupled to the frame 602. The mirrors 604 can respectively include a reflective material, such as but not limited to glass or polished glass. The frame 602 and the plurality of mirrors 604 are included in a rotating optical structure having a polygonal cross section.

In some implementations, polygon scanner 504 can be formed by machining metal block. In some implementations, polygon scanner 504 can be assembled from separate components to have improved optical and mechanical performance, including mirror form factor flexibility, low weight/inertia for a given mirror size, optical surface quality (e.g., lack of roughness), lower cost at volume, and robustness with respect to stresses such as thermal, shock, and vibration stresses.

Referring still to FIG. 6, the mirrors 604 can be facets, and can have outward-facing surfaces 606 through which incoming beams are received and then reflected by the mirrors 604 to be outputted from the surfaces 606. The mirrors 604 can be reflective to light used for LIDAR applications (e.g., light received from the laser source 404 via one or more components as depicted in FIG. 4 or 5 between the laser source 404 and the optics 432). For example, the mirrors 604 can be reflective to light having a wavelength greater than or equal to 1100 nm and less than or equal to 1800 nm, including light of about 1550 nm.

In some implementations, the polygonal scanner 504 can correspond to a rotating optical structure having a polygonal cross section that can be designed in accordance with varied geometries. For instance, the polygon scanner 504 can include a rotating polygon having a predetermined number of regular sides. The polygon scanner 504 can include various numbers of mirrors 604 corresponding to the number of sides. For example, the polygon scanner 504 can include greater than or equal to three and less than or equal to twelve sides and corresponding mirrors 604. In some implementations, the polygon scanner 504 can include greater than or equal to three and less than or equal to six sides and corresponding mirrors 604. For example, polygon scanner 504 can be designed as a rotating: (A) triangle with three (3) regular sides; (B) square with four (4) regular sides; (C) pentagon with five (5) regular sides; and/or (D) hexagon with six (6) regular sides.

The mirrors 604 can be arranged around a perimeter 608 of the frame 602, such as to define the polygonal shape. Each mirror 604 can have a same shape as at least one other mirror 604, such as by having a rectangular shape with identical length and width, a circular or elliptical shape with identical perimeter, a convex or concave polygonal shape with identical numbers and lengths of sides, and various other such similar or identical shapes.

The frame 602 can include a shaft receiver inward from a wall. The shaft receiver can be a channel or other opening to allow a shaft (e.g., shaft or axle coupled with the motor 440 described with reference to FIGS. 4-5) to engage the frame 602, so that the motor 440 can rotate the shaft to rotate the frame 602 about an axis 610. The motor 440 can be coupled with the frame 602 using various shafts, gears, or other couplings to cause rotation of the frame 602 about the axis 610. The axis 610 can be defined to at least one of extend through the shaft receiver, coincide with an axis of rotation of the motor 440, or coincide with an axis of rotation of the shaft (e.g., the shaft may rotate about an axis offset from the motor 440 due to the use of gears or other assemblies).

Referring now to FIG. 7, a timing diagram 700 for an aperture-switching LIDAR system (e.g., aperture-switching LIDAR system 500 of FIG. 5) is depicted. Timing diagram 700 illustrates a first angle profile 702 associated with the first beam portion 508 and first transmitted beam 520 of FIG. 5 and a second angle profile 704 associated with the second beam portion 510 and second transmitted beam 522 of FIG. 5. The first angle profile 702 is depicted with a solid line in FIG. 7, while the second angle profile is depicted with a dashed line in FIG. 7.

A pulsed timing signal 705 is intended to represent alternating portions of time when switch 502 toggles between the first beam portion 508 and corresponding transmitted beam 520 and the second beam portion 510 and corresponding transmitted beam 522. High pulses (on) within the timing signal 705 correspond to a first time window 706, while low pulses (off) within the timing signal 705 correspond to a second time window 708. The switch 502 of FIG. 5 is configured to channel first beam portion 508 through first aperture 512 during first time window 706. Switch 502 is further configured to channel second beam portion 510 through second aperture 514 during second time window 708. Polygon scanner 504 is configured to receive and reflect the first beam portion 508 as first transmitted beam 520 during first time window 706. Polygon scanner

504 is configured to receive and reflect the second beam portion 510 as second transmitted beam 522 during second time window 708.

In general, the first time window 706 and the second time window 708 are substantially non-overlapping and non-concurrent. In some implementations, the polygon scanner 504 can be configured to receive and reflect the alternating first and second beam portions 508, 510 during alternating first and second time windows 706, 708 in order to advantageously increase an effective duty cycle of the LIDAR system 500. The polygon scanner 504 can alternately transmit first transmitted beam 520 during first time window 706 and second transmitted beam 522 during second time window 708 in a successive fashion. As shown in FIG. 7, for a switched two-aperture hexagon scanner, a field of view has substantially complete overlap from each aperture. In other words, the first transmitted beam and second transmitted beams reflected by a hexagon scanner are both respectively reflected into a given field of view across the same entirety of an associated angular range (e.g., 60 degrees).

Another way of considering the timing diagram 700 of FIG. 7 relates to the respective portions of time during which the first beam portion is illuminated through the first aperture and the second beam portion is illuminated through the second aperture. In some implementations, considering a given time window corresponding to a combination of time windows 706 and 708, the first beam portion is illuminated through the first aperture for a first portion of a given time window, the first portion corresponding to between about forty-five and fifty-five percent (e.g., 50%) of the given time window (e.g., 706+708). Similarly, the second beam portion is illuminated through the second aperture for a second portion of the given time window (e.g., 706+708), the second portion corresponding to between about forty-five and fifty-five percent (e.g., 50%) of the given time window.

Referring still to FIGS. 5 and 7, a polygon scanner 504 can be provided in a configuration where the first and second beam portions 508, 510 come in towards polygon scanner 504 from respective opposing sides within a plane orthogonal to the rotational axis 610 and are reflected by the polygon scanner 504 in the forward direction as depicted by the first and second transmitted beams 520, 522. For a two-aperture configuration as depicted in FIG. 5, the first and second (squint) angles associated with the direction of first and second beam portions directed to polygon scanner 504 modifies when and at what output angles the facet breaks for each aperture from every polygon face occur. The angle and timing of the facet breaks can be appreciated from the timing diagram 700 of FIG. 7. When the lidar light is switched from the first aperture 512 to the second aperture 514 with a 50% duty cycle, the facet break for a given aperture should be controlled to occur in the "off state" of the other aperture. Ideally this facet break is centered in the middle of the "off state" for each aperture 512, 514.

It should be appreciated that the FIGS. 5 and 7 describe a hexagon scanner and corresponding performance parameters. However, aperture-switching LIDAR systems in accordance with the disclosed technology can be implemented in alternative configurations. For example, a triangle scanner implementation with three (3) regular sides can be implemented with a squint angle of about 21.25 degrees±1.25 degrees. In another example, a square scanner implementation with four (4) regular sides can be implemented with a squint angle of about 20 degrees±5 degrees. In yet another example, a pentagon scanner implementation with five (5) regular sides can be implemented with a squint angle of about 3 degrees±3 degrees. Finally, a hexagon scanner implementation with six (6) regular sides can be implemented with a squint angle of about 0 degrees±3 degrees. As the number of sides of the polygon scanner increases (e.g., from 3 sides to 6 sides), the field of view per aperture, the total field of view for the scanner, and the amount of overlap across apertures generally decreases, yet remains effective for purposes of achieving quality performance parameters in the intended autonomous vehicle applications.

Figure 8:
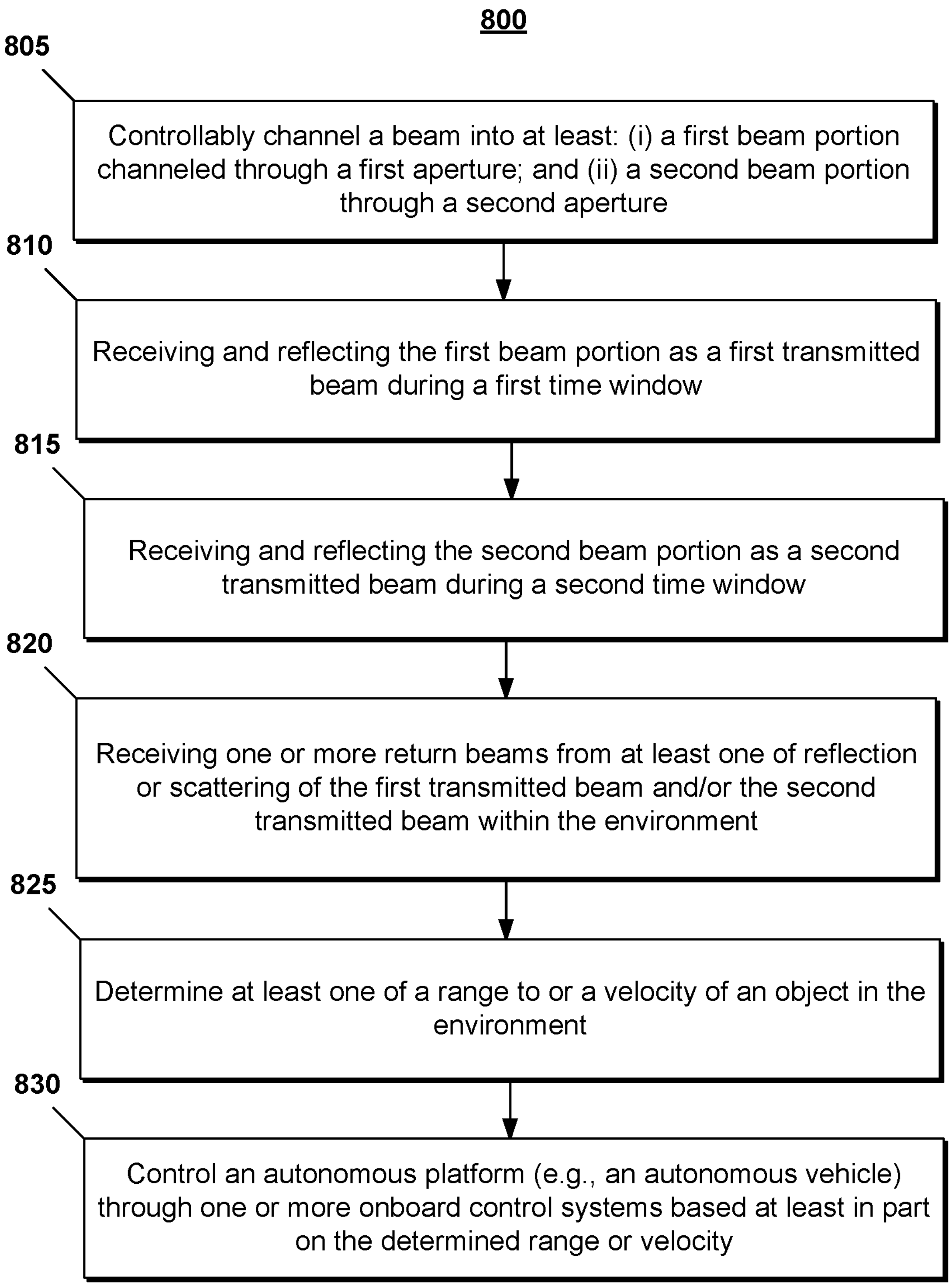
FIG. 8 is a flow chart of an example method for controlling an autonomous platform according to some implementations of the present disclosure.

FIG. 8 depicts a flowchart of a method 800 for controlling an autonomous platform (e.g., an autonomous vehicle) according to aspects of the present disclosure. One or more portion(s) of the method 800 can be implemented by a computing system that includes one or more computing devices such as, for example, computing system 180 of FIG. 1 and/or autonomy system 200 of FIG. 2 in conjunction with one or more LIDAR systems such as LIDAR system 400 of FIG. 4 and/or LIDAR system 500 of FIG. 5. Each respective portion of the method 800 can be performed by any (or any combination) of one or more devices or systems. Moreover, one or more portion(s) of the method 800 can be implemented as an algorithm on the hardware components of the device(s) described herein (e.g., FIGS. 1A-5).

FIG. 8 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 8 is described with reference to elements/terms described with respect to other systems and figures for exemplary illustrated purposes and is not meant to be limiting. One or more portions of method 800 can be performed additionally, or alternatively, by other systems.

At step 805, method 800 includes a LIDAR system controllably channeling a beam (e.g., a light beam from a laser source such as laser source 404 of FIGS. 4-5) into at least: (i) a first beam portion channeled through a first aperture; and (ii) a second beam portion channeled through a second aperture. The first beam portion channeled through the first aperture can correspond, for example, to first beam portion 508 and first aperture 512 of FIG. 5. The second beam portion channeled through the second aperture can correspond, for example, to the second beam portion 510 and second aperture 514 of FIG. 5.

At step 810, method 800 includes a LIDAR system receiving and reflecting, by a polygon scanner, the first beam portion during a first time window. The polygon scanner configured to receive and reflect the first beam portion at step 810 can correspond, for example, to polygon scanner 504 depicted in FIGS. 5-6. The beam reflected by the polygon scanner in the first time window can correspond, for example, to first transmitted beam 520 of FIG. 5 being transmitted during first time window 706 of FIG. 7.

In some implementations, before receiving and reflecting the first beam portion by the polygon scanner at step 810, method 800 includes directing the first beam portion channeled through the first aperture to a first reflective surface that reflects the first beam portion towards the polygon scanner at a first angle. The first reflective surface can correspond, for example, to first reflective surface 534 of FIG. 5

At step 815, method 800 includes a LIDAR system receiving and reflecting, by the polygon scanner, the second beam portion during a second time window. The polygon scanner configured to receive and reflect the second beam portion at step 815 can correspond, for example, to polygon scanner 504 depicted in FIGS. 5-6. The beam reflected by the polygon scanner in the second time window can correspond, for example, to second transmitted beam 522 of FIG. 5 being transmitted during second time window 708 of FIG. 7.

In some implementations, before receiving and reflecting the second beam portion by the polygon scanner at step 815, method 800 includes directing the second beam portion channeled through the second aperture to a second reflective surface that reflects the second beam portion towards the polygon scanner at a second angle. The second reflective surface can correspond, for example, to second reflective surface 536 of FIG. 5

In some implementations, the polygon scanner used to reflect the respective first and second beam portions at steps 810, 815 includes a rotating structure having a hexagon-shaped cross section or a rotating polygon having a plurality of reflective surfaces. For such a hexagon scanner, the first and second angles at which the first and second beam portions are directed to the polygon scanner can be between about negative three degrees and positive three degrees.

In some implementations, method 800 can include repeating steps 810 and 815 in a plurality of alternating successive first and second time windows. In some implementations, the first and second time windows are non-overlapping and/or non-concurrent. In some implementations, the first beam portion is illuminated through the first aperture for a first portion of a given time window (e.g., 45-55%), while the second beam portion is illuminated through the second aperture for a second portion of the given time window (e.g., 45-55%).

In some implementations, method 800 can include operatively controlling a switch and motor of the polygon scanner to control a timing of the first time window and the second time window. For example, the switch and motor can be synchronized relative to a control clock such that they are respectively controlled according to an absolute timing sequence. Alternatively, the switch and motor can be controlled relative to one another. Under either an absolute or relative timing synchronization, the switch and motor can be controlled to effect the timing diagram depicted in FIG. 7 or other predetermined switching sequence between apertures relative to the rotation of the polygon scanner. The effective timing of aperture-switching can result in a duty cycle of the polygon scanner between greater than or equal to eighty (80) percent, reaching a level of about 100 percent in some embodiments.

At step 820, method 800 includes receiving, by a LIDAR system, one or more return beams from an environment of the LIDAR system. The one or more return beams received at step 820 can correspond, for example, to one or more of the return beams 530, 532 of FIG. 5. The one or more return beams received at step 820, can correspond to return beams received from at least one of reflection or scattering of the first and second transmitted beams 520, 522 within the environment of the LIDAR system (e.g., an environment of a vehicle such as but not limited to an autonomous vehicle).

At step 825, method 800 includes determining at least one of a range to or a velocity of an object using the return beam(s) received at step 830. For example, an object in the environment of a vehicle can correspond to another vehicle, a bicycle, a pedestrian, or other dynamic object. In some implementations, determining at least one of a range to or a velocity of an object at step 825 is implemented by autonomy system 200 of FIG. 2 (e.g., perception system 240 within autonomy system 200).

At step 830, method 800 includes controlling operation of an autonomous vehicle responsive to the at least one of the range or velocity determined at step 825. In some implementations, controlling operation of an autonomous vehicle at step 830 is implemented by autonomy system 200 of FIG. 2 (e.g., control system 260 of autonomy system 200 and/or associated platform control devices).

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. Lists joined by a particular conjunction such as "or," for example, can refer to "at least one of" or "any combination of" example elements listed therein.

What is claimed is:

1. A light detection and ranging (LIDAR) system for a vehicle, the LIDAR system comprising:

a laser source configured to generate a beam;

a switch configured to controllably channel the beam into at least: (i) a first beam portion channeled through a first aperture; and (ii) a second beam portion channeled through a second aperture;

a polygon scanner configured to: (i) receive and reflect the first beam portion during a first time window; and (ii) receive and reflect the second beam portion during a second time window; and a controller operatively coupled to the switch and a motor of the polygon scanner, the controller configured to control a timing of the switch and a timing of the motor to configure the LIDAR system to (i) channel the first beam portion through the first aperture and (ii) channel the second beam portion through the second aperture.

2. The LIDAR system of claim 1, further comprising:

a first reflective surface configured to receive the first beam portion channeled through the first aperture and reflect the first beam portion towards the polygon scanner at a first angle; and a second reflective surface configured to receive the second beam portion channeled through the second aperture and reflect the second beam portion towards the polygon scanner at a second angle.

3. The LIDAR system of claim 2, wherein:

the polygon scanner comprises a rotating structure having a hexagon-shaped cross section; and the first angle and the second angle are between negative three degrees and positive three degrees.

4. The LIDAR system of claim 1, wherein the first time window and the second time window are non-overlapping.

5. The LIDAR system of claim 1, wherein;

the polygon scanner is configured to reflect the first beam portion during the first time window as a first transmitted beam into a given field of view having an associated angular range; and the polygon scanner is configured to reflect the second beam portion during the second time window as a second transmitted beam into the given field of view and over the associated angular range.

6. The LIDAR system of claim 1, wherein:

the first beam portion is illuminated through the first aperture for a first portion of a given time window, the first portion corresponding to between about forty-five and fifty-five percent of the given time window; and the second beam portion is illuminated through the second aperture for a second portion of the given time window, the second portion corresponding to between about forty-five and fifty-five percent of the given time window.

7. The LIDAR system of claim 1, wherein the polygon scanner comprises a rotating polygon having a plurality of reflective surfaces.

8. The LIDAR system of claim 1, wherein the controller configures the LIDAR system to (i) channel the first beam portion through the first aperture during a facet break region of the polygon scanner relative to the second aperture and (ii) channel the second beam portion through the second aperture during a facet break region of the polygon scanner relative to the first aperture.

9. The LIDAR system of claim 1, wherein a duty cycle of the polygon scanner is between 80 percent and 100 percent.

10. The LIDAR system of claim 1, wherein the first time window and the second time window are alternately repeated in a successive manner over time.

11. An autonomous vehicle control system comprising:

a LIDAR system comprising:

a laser source configured to generate a beam;

a switch configured to controllably channel the beam into at least: (i) a first beam portion channeled through a first aperture; and (ii) a second beam portion channeled through a second aperture;

a polygon scanner configured to: (i) receive and reflect the first beam portion during a first time window; and (ii) receive and reflect the second beam portion during a second time window; and a controller operatively coupled to the switch and a motor of the polygon scanner, the controller configured to control a timing of the switch and a timing of the motor to configure the LIDAR system to (i) channel the first beam portion through the first aperture and (ii) channel the second beam portion through the second aperture.

12. The autonomous vehicle control system of claim 11, the LIDAR system further comprising:

a first reflective surface configured to receive the first beam portion channeled through the first aperture and reflect the first beam portion towards the polygon scanner at a first angle; and a second reflective surface configured to receive the second beam portion channeled through the second aperture and reflect the second beam portion towards the polygon scanner at a second angle.

13. The autonomous vehicle control system of claim 12, wherein:

the polygon scanner comprises a rotating structure having a hexagon-shaped cross section; and the first angle and the second angle are between negative three degrees and positive three degrees.

14. The autonomous vehicle control system of claim 11, wherein:

the polygon scanner is configured to reflect the first beam portion during the first time window as a first transmitted beam into a given field of view having an associated angular range; and the polygon scanner is configured to reflect the second beam portion during the second time window as a second transmitted beam into the given field of view and over the associated angular range.

15. The autonomous vehicle control system of claim 11, wherein the first time window and the second time window are non-overlapping.

16. The autonomous vehicle control system of claim 11, wherein:

the first beam portion is illuminated through the first aperture for a first portion of a given time window, the first portion corresponding to between about forty-five and fifty-five percent of the given time window; and the second beam portion is illuminated through the second aperture for a second portion of the given time window, the second portion corresponding to between about forty-five and fifty-five percent of the given time window.

17. The autonomous vehicle control system of claim 11, wherein the polygon scanner comprises a rotating polygon having a plurality of reflective surfaces.

18. The autonomous vehicle control system of claim 11, wherein the controller configures the LIDAR system to (i) channel the first beam portion through the first aperture during a facet break region of the polygon scanner relative to the second aperture and (ii) channel the second beam portion through the second aperture during a facet break region of the polygon scanner relative to the first aperture.

19. The LIDAR system of claim 1, wherein a duty cycle of the polygon scanner is between 80 percent and 100 percent.

20. An autonomous vehicle comprising:

a LIDAR system comprising:

a laser source configured to generate a beam;

a switch configured to controllably channel the beam into at least: (i) a first beam portion channeled through a first aperture; and (ii) a second beam portion channeled through a second aperture;

a polygon scanner configured to: (i) receive and reflect the first beam portion during a first time window; and (ii) receive and reflect the second beam portion during a second time window; and a controller operatively coupled to the switch and a motor of the polygon scanner, the controller configured to control a timing of the switch and a timing of the motor to configure the LIDAR system to (i) channel the first beam portion through the first aperture and (ii) channel the second beam portion through the second aperture.

* * * * *